(12) United States Patent
Strashny et al.

(10) Patent No.: US 12,728,735 B2
(45) Date of Patent: Sep. 8, 2026

(54) AC/DC SUBSTATION CONFIGURABLE BETWEEN CHARGING AND POWERING MODES

(71) Applicant: Caterpillar Inc., Peoria, IL (US)

(72) Inventors: Igor Strashny, Tucson, AZ (US); Zeljko Jankovic, Mequon, WI (US); Bharadwaj Kaka, Bengaluru (IN); Qing Ye, Katy, TX (US)

(73) Assignee: Caterpillar Inc., Peoria, IL (US)

(*) Notice: Subject to any disclaimer, the term of this patent is extended or adjusted under 35 U.S.C. 154(b) by 148 days.

(21) Appl. No.: 18/899,593

(22) Filed: Sep. 27, 2024

(65) Prior Publication Data

US 2026/0095107 A1 Apr. 2, 2026

(51) Int. Cl.
*B60L 50/53* (2019.01)
*B60L 9/04* (2006.01)
(Continued)

(52) U.S. Cl.
CPC ................ *B60L 50/53* (2019.02); *B60L 9/04* (2013.01); *B60L 50/60* (2019.02); *B60L 53/11* (2019.02);
(Continued)

(58) Field of Classification Search
CPC .. B60L 9/04; B60L 50/53; B60L 50/60; B60L 53/11; B60L 53/30; B60L 2200/36;
(Continued)

(56) References Cited

U.S. PATENT DOCUMENTS 9,555,715 B2 1/2017 Sugano
9,988,835 B2 6/2018 Storm
(Continued)

FOREIGN PATENT DOCUMENTS

CN 106059041 A 10/2016
CN 106483408 A 3/2017
(Continued)

OTHER PUBLICATIONS

Machine translation of JP 2002095260 A. Obtained from https://worldwide.espacenet.com/ on Apr. 15, 2026. (Year: 2002).*
(Continued)

*Primary Examiner* — Fred E Finch, III
(74) *Attorney, Agent, or Firm* — Lee & Hayes, PLLC

(57) ABSTRACT

An electrical substation that transforms AC voltage to DC voltage is configurable between a current-source mode for charging batteries of a stationary work machine and a voltage-source mode for powering motors of a moving work machine. The substation receives medium-voltage AC power from a grid and includes a pair of DC power converters each formed from three-phase transformers and a single stage of silicon-controlled rectifier units. Adjustable connectors enable combining the power converters in parallel or keeping them separate to operate in the current-source mode for charging the machine batteries with up to 4800 ADC at 6 MW or for providing up to 1500 VDC in powering voltage. The connectors further enable combining the power converters in series to operate in the voltage-source mode for powering the machine motors with up to 3000 VDC at 6 MW. Sized to fit within a standard high-cube ISO shipping container with minimal components, the portable substation provides versatility with high power density and low cost per kilowatt.

20 Claims, 7 Drawing Sheets

(51) Int. Cl.

| | |
|---|---|
| ***B60L 50/60*** | (2019.01) |
| ***B60L 53/10*** | (2019.01) |
| ***H02J 1/04*** | (2006.01) |
| ***H02J 1/082*** | (2026.01) |
| ***H02J 4/25*** | (2026.01) |
| ***H02J 7/02*** | (2016.01) |
| ***H02M 1/00*** | (2007.01) |
| ***H02M 7/155*** | (2006.01) |
| *B60L 53/30* | (2019.01) |
| *H02J 7/00* | (2006.01) |
| *H02J 105/10* | (2026.01) |
| *H02M 7/162* | (2006.01) |
| *H02M 7/17* | (2006.01) |
| *H02M 7/19* | (2006.01) |

(52) U.S. Cl.

CPC ................ *H02J 1/04* (2013.01); *H02J 1/082* (2020.01); *H02J 4/25* (2026.01); *H02J 7/02* (2013.01); *H02M 1/0077* (2021.05); *H02M 1/0083* (2021.05); *B60L 53/30* (2019.02); *B60L 2200/36* (2013.01); *B60L 2200/40* (2013.01); *B60L 2210/10* (2013.01); *B60L 2210/30* (2013.01); *H02J 7/865* (2026.01); *H02J 2105/10* (2026.01); *H02M 7/1552* (2013.01); *H02M 7/162* (2013.01); *H02M 7/17* (2013.01); *H02M 7/19* (2013.01)

(58) Field of Classification Search

CPC ............. B60L 2200/40; B60L 2210/10; B60L 2210/30; H02J 1/04; H02J 1/082; H02J 4/25; H02J 7/02; H02J 7/865; H02J 2105/10; H02M 1/0077; H02M 1/0083; H02M 7/1552; H02M 7/162; H02M 7/17; H02M 7/19

See application file for complete search history.

(56) References Cited

U.S. PATENT DOCUMENTS

| | | | | |
|---|---|---|---|---|
| 10,046,659 | B2 | 8/2018 | Bucher et al. | |
| 10,300,803 | B2 | 5/2019 | Lannoije et al. | |
| 11,383,605 | B2 | 7/2022 | Tombelli | |
| 2010/0264898 | A1* | 10/2010 | Ramakers ............... | H02M 1/15 323/312 |
| 2010/0277960 | A1 | 11/2010 | Cottingham et al. | |
| 2011/0094841 | A1* | 4/2011 | Mazumdar ............... | B60M 7/00 191/33 R |
| 2013/0308361 | A1* | 11/2013 | Steigerwald .......... | H02M 7/162 363/129 |
| 2022/0118864 | A1* | 4/2022 | Zhang ..................... | B60L 53/14 |
| 2022/0219546 | A1* | 7/2022 | Kouvo ...................... | B60L 9/00 |
| 2023/0166613 | A1* | 6/2023 | Braunstein ............. | B60L 53/35 701/25 |
| 2023/0361599 | A1 | 11/2023 | Podhola | |
| 2024/0186908 | A1 | 6/2024 | Pan et al. | |
| 2025/0047124 | A1* | 2/2025 | Chen ......................... | H02J 7/02 |
| 2025/0050750 | A1* | 2/2025 | Watanabe ............... | B60L 50/53 |
| 2025/0360813 | A1* | 11/2025 | Selvey .................... | B60L 53/11 |

FOREIGN PATENT DOCUMENTS

| | | | |
|---|---|---|---|
| CN | 212811585 | U | 3/2021 |
| EP | 2911264 | A1 | 8/2015 |
| JP | 2002095260 | A | 3/2002 |
| JP | 2019096104 | A | 6/2019 |

OTHER PUBLICATIONS

Machine translation of CN 106483408 A. Obtained from https://worldwide.espacenet.com/ on Apr. 15, 2026. (Year: 2017).*

Written Opinion and International Search Report for Int'l. Patent Appln. No. PCT/US2025/046109, mailed Dec. 19, 2025 (13 pgs).

* cited by examiner

400
VAC
401
404
421
424
302
322
308
328
340
AUX
450A
450B
470A
470B
406A
406B
408A
408B
426A
426B
428A
428B
310A
310B
312
330A
330B
332
410
412
414
430
432
434
314A
314B
334A
334B
S1
S2
S3
S4
S5
S6
S7
S8
S9
342A
342B
344A
344B
346A
346B
370
372
108

AC/DC SUBSTATION CONFIGURABLE BETWEEN CHARGING AND POWERING MODES

TECHNICAL FIELD

The present disclosure relates to an AC/DC electrical substation configurable during operation between a charging mode and a powering mode. More specifically, the present disclosure relates to an AC/DC substation configurable between a current-source mode for charging a battery of a stationary vehicle with DC current and a voltage-source mode for powering an electric motor of a moving vehicle with DC voltage.

BACKGROUND

Heavy work machines, such as earth-moving vehicles or hauling trucks, require significant power to carry out their functions. The machines themselves can be of substantial weight, and their loads require large amounts of power to move. Diesel engines traditionally provide that power, but they can have disadvantages. For instance, supplies of diesel fuel may be far away from a haul route or work location, and diesel machines can generate significant pollution.

Electrically powered machines can provide many advantages over diesel machines, but also pose some challenges. The electric engine and components in the work machine require significant electrical power at different voltage levels. For instance, to propel machines along a predetermined haul route, an electrical substation may deliver several megawatts at up to 3000 VDC through power rails to sliding contactors on the electrically powered machines as the machines move. Onboard batteries may propel the electric machines outside the haul route and drive ancillary components, but those batteries need to be charged periodically at several megawatts and up to 4800 ADC. Balancing these demands presents a challenge for a substation.

Moreover, a substation, or power module, transferring DC power to a conductor such as a rail for powering electric motors in a moving machine or to a cable for charging batteries in a stationary machine needs to be portable and consolidated. A mine site, for instance, typically exists in a remote and rugged environment with access only to alternating current (AC) from medium-voltage distribution lines. As a result, equipment in a substation to transform and convert the medium-voltage AC power to lower voltage DC power usable by the work machines must be shipped to the work site. As the mining, logging, or other activity at the site evolves, the substation may need to be relocated. Consolidation of the powering and charging functions into the same equipment would increase the speed and efficiency of shipping, commissioning, and decommissioning the substation.

One arrangement for transferring power to an electric vehicle is described in U.S. Pat. No. 10,300,803 ("the '803 patent"). The '803 patent describes an inductive power system for transferring electric power from primary windings on a wayside control unit to primary windings on an electric vehicle to charge a traction battery of the vehicle or to power the vehicle. The primary and secondary windings form a high-frequency transformer, and varying a size of a gap between the primary and secondary windings can adjust a voltage rectified in the vehicle based on the charging characteristics of the traction battery. Among other things, the system of the '803 patent does not address the challenges of providing different levels of high DC voltage and high DC current by the same configurable equipment, nor does it address the space and portability constraints of a substation in a remote location. As a result, the inductive power transfer system of the '803 patent is not desirable as a unit for transferring high-voltage DC power that is configurable in the field between a charging mode and a powering mode.

Examples of the present disclosure are directed to overcoming deficiencies of such systems.

SUMMARY

In an aspect of the present disclosure, a configurable unit for transferring electrical energy as DC voltage includes an input structured to receive three-phase medium-voltage AC power exceeding 10 kV from an external source, a first power converter, a second power converter, a DC filter, and adjustable connectors electrically coupled to the DC filter. The first power converter includes a first three-phase transformer, which is electrically coupled to the input, configured to provide a step-down of the medium-voltage AC power and a first multi-pulse rectification in a single stage that includes a six-pulse silicon-controlled rectifier unit. The second power converter includes a second three-phase transformer electrically coupled to the input and a second multi-pulse rectification in a single stage. The second three-phase transformer is configured to provide a phase shift and the step-down of the medium-voltage AC power and includes a six-pulse silicon-controlled rectifier unit. The DC filter has inputs coupled to the first multi-pulse rectification and to the second multi-pulse rectification and filtered outputs providing a filtered voltage exceeding 1 kV. The adjustable connectors are changeable between a current-source configuration for charging a battery through the filtered outputs and a voltage-source configuration for powering an electrical motor through the filtered outputs.

In another aspect of the present disclosure, a system includes a mobile machine having a battery bus electrically coupled to a battery, a traction bus electrically coupled to an electric motor, and a configurable power module for transferring DC electrical energy to the movable machine. The configurable power module includes an input structured to receive medium-voltage AC power from an external source, a first power converter, a second power converter, a DC filter, and adjustable connectors electrically coupled to the DC filter. The first power converter includes a first three-phase transformer electrically coupled to the input and first multi-pulse rectification circuitry. The first transformer is configured to provide a phase shift and a first step-down voltage from the medium-voltage AC power, and the first multi-pulse rectification circuitry has a single stage and is configured to produce a first ripple voltage from the first step-down voltage. The second power converter includes a second three-phase transformer electrically coupled to the input and second multi-pulse rectification circuitry. The second transformer is configured to provide the phase shift and a second step-down voltage from the medium-voltage AC power, and the second multi-pulse rectification circuitry has a single stage and is configured to produce a second ripple voltage from the second step-down voltage. The DC filter is configured to provide a filtered output from the first ripple voltage and the second ripple voltage. The adjustable connectors are changeable between a charging mode and a powering mode. The charging mode is configured to provide current of the filtered output to the battery bus via a first charging conductor while the mobile machine is stationary, and the powering mode is configured to provide voltage of the filtered output to the traction bus via a powering conductor while the mobile machine is moving.

In yet another aspect of the present disclosure, a method includes receiving medium-voltage AC power at a substation from an external source, stepping down the medium-voltage AC power to a first stepped-down AC voltage in a first power converter of the substation, and providing multi-pulse rectification to the first stepped-down AC voltage to generate a first rectified DC voltage. The method further includes stepping down and phase shifting the medium-voltage AC power to a second stepped-down AC voltage in a second power converter of the substation and providing multi-pulse rectification to the second stepped-down AC voltage to generate a second rectified DC voltage. The first rectified DC voltage and the second rectified DC voltage are then filtered in a DC filter. In a charging mode, DC current from one of the first power converter and the second power converter of the substation is fed through a first charging conductor to a battery of a stationary mobile machine. The method further includes converting from the charging mode to a powering mode by establishing a series connection between the first power converter and the second power converter. In the powering mode, the first rectified DC voltage and the second rectified DC voltage are supplied as a series combination from the substation through a powering conductor to an electric motor of a moving mobile machine.

BRIEF DESCRIPTION OF DRAWINGS

The detailed description references the accompanying figures. In the figures, the left-most digit of a reference number identifies the figure in which the reference number first appears. The same reference numbers indicate similar or identical items.

DETAILED DESCRIPTION

Consistent with the principles of the present disclosure, an electrical substation transforms AC voltage to DC voltage and is configurable between a current-source mode for charging batteries of a stationary work machine and a voltage-source mode for powering motors of a moving work machine. The substation may receive medium-voltage AC power from a grid and includes a pair of DC power converters. Each power converter is formed from three-phase transformers and a single stage of silicon-controlled rectifier units. Adjustable connectors in the form of switches or removable busbars, for example, enable combining the power converters in parallel or keeping them separate to operate in the current-source mode for charging the machine batteries with up to 4800 ADC at 6 MW. The adjustable connectors further enable combining the power converters in series to operate in the voltage-source mode for powering the machine motors with up to 3000 VDC at 6 MW. Sized to fit within a standard high-cube ISO shipping container with minimal components, the portable substation provides versatility with high power density and low cost per kilowatt. The following describes several examples for carrying out the principles of this disclosure.

Figure 1:
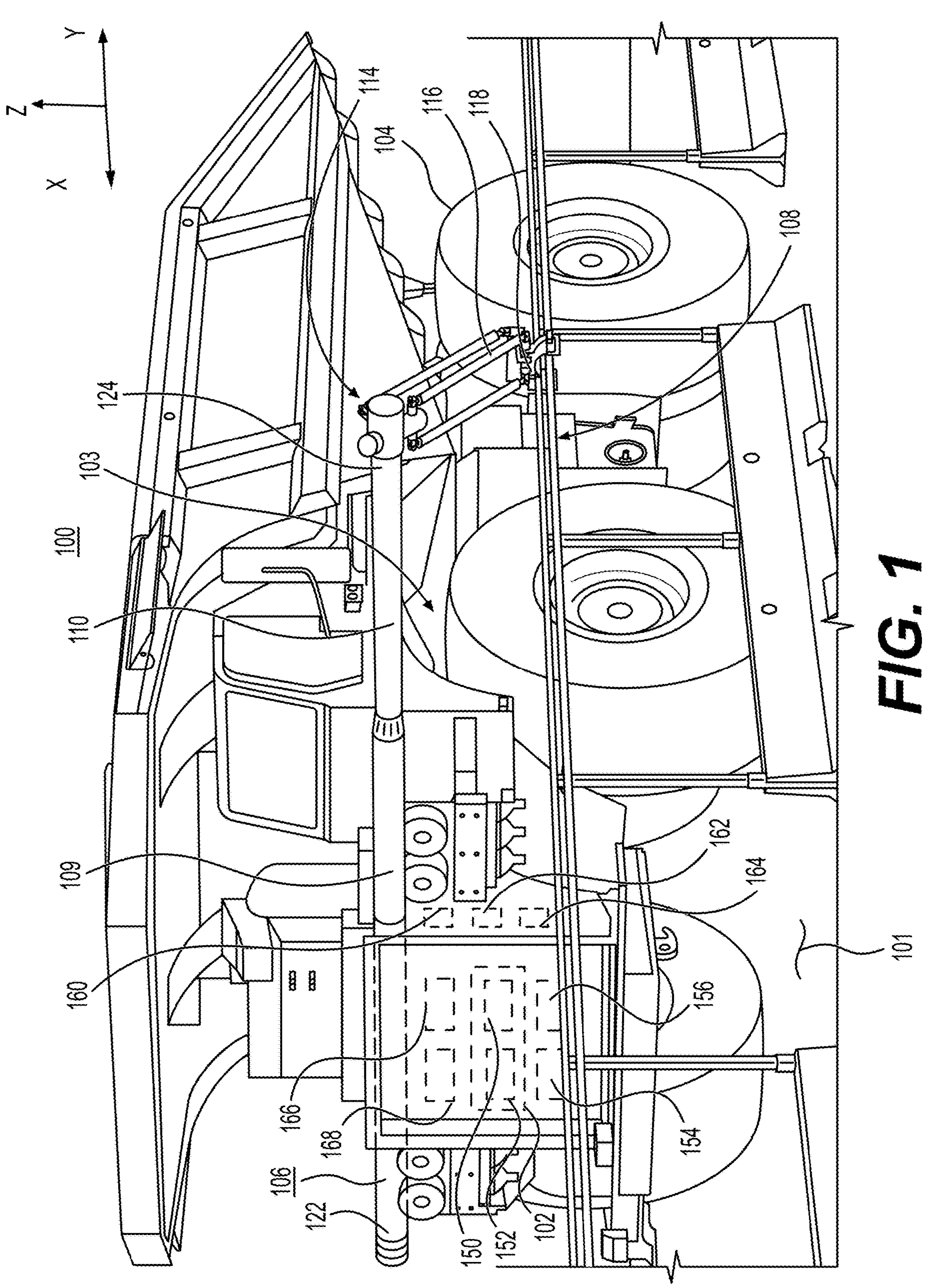
FIG. 1 is a schematic illustration of an electrically powered work machine coupled to a roadside power source in accordance with an example of the present disclosure.

FIG. 1 illustrates an isometric view of a work machine 100 within an XYZ coordinate system as one example suitable for receiving charging current and/or powering voltage from the configurable substation of this disclosure. Exemplary work machine 100 travels parallel to the X axis along a roadway, also termed a haul route 101, typically from a source to a destination within a worksite. In one implementation as illustrated, work machine 100 is a hauling machine that hauls a load within or from a worksite within a mining operation. For instance, work machine 100 may haul excavated ore or other earthen materials from an excavation area along haul route 101 to dump sites and then return to the excavation area. In this arrangement, work machine 100 may be one of many similar machines configured to ferry earthen material in a trolley arrangement. While a large mining truck in this instance, work machine 100 may be any machine that carries a load between different locations within a worksite, examples of which include an articulated truck, an off-highway truck, an on-highway dump truck, a wheel tractor scraper, or any other similar machine. Alternatively, work machine 100 may be an off-highway truck, on-highway truck, a dump truck, an articulated truck, a loader, an excavator, a pipe layer, or a motor grader. In other implementations, work machine 100 need not haul a load and may be any machine associated with various industrial applications including, but not limited to, mining, agriculture, forestry, construction, and other industrial applications.

Referring to FIG. 1, and relevant to the present disclosure, an example work machine 100 includes a frame 103 powered by electric engine 102 to cause rotation of traction devices 104. Traction devices 104 are typically four or more wheels with tires, although tracks or other mechanisms for engagement with the ground along haul route 101 are possible. Electric engine 102 provides mechanical energy to work machine 100 based on electrical power sources, such as described in further detail below. An example of mechanical energy provided by electric engine 102 includes propelling traction devices 104 to cause movement of work machine 100 along haul route 101, but electric engine 102 also includes components sufficient to power other affiliated operations within work machine 100. For instance, in some implementations, electric engine 102 includes equipment for converting electrical energy to provide pneumatic or hydraulic actions within work machine 100. While electric engine 102 is configured to operate from an external electrical power source, electric engine 102 typically includes one or more batteries for storing electrical energy for auxiliary or backup operations, as discussed in more detail below.

Electric engine 102 includes one or more motors 150 responsible for generating torque to propel work machine 100. Motors 150 may be of any suitable type, such as induction motors, permanent magnet motors, switched reluctance (SR) motors, combinations thereof, or the like. Motors 150 are of any suitable voltage, current, and/or power rating. Motors 150 when operating together are configured to propel the work machine 100 as needed for tasks that are to be performed by the work machine 100. For example, the motors 150 may be rated for a range of about 500V to about 3000V. A motor controller 152 includes control electronics configured to control the operation of motors 150. In some cases, each motor 150 may be controlled by its own motor controller 152. In other cases, all the motors of work machine 100 may be controlled by a single motor controller 152. The motor controller 152 may further include one or more inverters or other circuitry to control the energizing of magnetic flux generating elements (e.g., coils) of motors 150. Motors 150 are mechanically coupled to a variety of drive train components, such as a drive shaft and/or axles or directly to traction devices 104 to propel work machine 100. Although not shown here, there may be one or more motors that are not used for propulsion of the work machine 100, but rather to operate pumps and/or other auxiliary components, such as to operate hydraulic systems.

According to examples of the disclosure, electrical power to energize motors 150 is received from a battery module 154. Battery module 154 may provide power for operating motors 150 and/or other power consuming components (e.g., controllers, cooling systems, displays, actuators, sensors, etc.) of work machine 100. The presently disclosed subject matter is not limited solely to the use of battery power, as other forms of energy may be used in conjunction with the power provided by the battery module 154, including, but not limited to, internal combustion engines or fuel cells, and external electrical sources discussed further below.

Battery module 154 may be of any suitable type and capacity. Battery module 154 includes one or more cells, that when electrically connected, operate as a battery to provide the voltage, current, and/or power requirements of the work machine 100. For example, the battery module may include cells forming a lithium ion battery, a lead-acid battery, an aluminum ion battery, a flow battery, a magnesium ion battery, a potassium ion battery, a sodium ion battery, a metal hydride battery, a nickel metal hydride battery, a cobalt metal hydride battery, a nickel-cadmium battery, a wet cell of any type, a dry cell of any type, a gel battery, combinations thereof, or the like. A battery controller 156 monitors and controls various aspects of the battery module 154, such as controlling a temperature of the battery, the prevention of an over discharge condition, and charging characteristics and demands.

In addition to, or alternative to, obtaining electrical energy from battery module 154, electric engine 102 may obtain electrical energy from an external source. For example, work machine 100 further includes a conductor rod 106 configured to receive electrical power from power rails 108. In some examples, power rails 108 are one or more beams of metal arranged substantially parallel to and a distance above the ground. In FIG. 1, power rails 108 are positioned to be substantially parallel to the X axis and the direction of travel of work machine 100. Support mechanisms hold power rails 108 in place along a distance at the side of haul route 101 for work machine 100 to traverse. While shown in FIG. 1 to the left of work machine 100 as work machine 100 travels in the direction of the X axis, power rails 108 may be installed to the right of work machine 100 or in other locations suitable to the implementation.

Power rails 108 provide a source of electrical power for work machine 100 as either AC or DC. In some examples, power rails 108 have two or more conductors, each providing voltage and current at a different electrical pole. In one implementation (e.g., an implementation in which the power rails 108 include three conductors), one conductor provides positive DC voltage, a second conductor provides negative DC voltage, and a third conductor provides 0V relative to the other two conductors. The two powered conductors within power rails 108 can provide a variety of voltage levels, such as a voltage difference greater than 2500V, which may be delivered as +1500 VDC and −1500 VDC in one example. These values are exemplary, and other physical and electrical configurations for power rails 108 are available and within the knowledge of those of ordinary skill in the art.

Conductor rod 106 enables electrical connection between work machine 100 and power rails 108, including during movement of work machine 100 along haul route 101. In the example shown in FIG. 1, conductor rod 106 is an elongated arm resembling a pole. FIG. 1 shows conductor rod 106 positioned along a front side of work machine 100, with respect to the direction of travel of work machine 100 in the direction of the X axis. As embodied in FIG. 1, conductor rod 106 includes a barrel 109 mounted to frame 103 of work machine 100. Barrel 109 has a hollow interior and may be a conductive metal having suitable mechanical strength and resiliency, such as aluminum. Within, and possibly including barrel 109, conductor rod 106 includes a series of electrical conductors passing longitudinally, at least from a head 122 at a proximal end to a tip 124 at a distal end. Tubular conductors within arm 110 slidably engage with corresponding tubular conductors within barrel 109 to maintain electrical continuity as arm 110 is extended or retracted. In other examples, conductor rod 106 may comprise a boom with a trailing or folding arm that is selectively movable with respect to frame 103 between a retracted position and an extended position. The boom may be pivotably connected to frame 103, while the trailing arm may be capable of being contracted or folded in a storage configuration when not in use.

At a position away from the work machine at tip 124, a connector assembly 114 provides an interface to power rails 108 via trailing arms 116 and contactor 118. Power rails 108 are typically arranged along a side of haul route 101, and work machine 100 is steered so that it traverses haul route 101 substantially in parallel with power rails 108. Contactor 118 may include multiple degrees of freedom to allow contactor 118 to align and ride on top of power rails 108. In operation, electrical power is accessed from power rails 108 via contactor 118, and the electrical power is conducted through trailing arms 116 into connector assembly 114 and to work machine 100 for powering electric engine 102 and otherwise enabling operations within work machine 100.

The different voltages provided by battery module 154 and power rails 108, along with other voltages used within work machine 100, may be distributed within the work machine on two or more voltage buses. In one example, work machine 100 has two voltage buses, a battery bus 160 and an accessory bus 162. In this situation, a traction system (not shown) within work machine 100 for propelling traction devices 104 may be configured to operate from a voltage level V1 provided by battery module 154. This battery voltage V1 may be greater than 700 volts, such as 750 VDC-1500 VDC, which would be provided on battery bus 160 from battery module 154 at least to the traction system within work machine 100. Electrical accessories within work machine 100, such as a water pump, an electric fan, a heating, ventilation, and air conditioning (HVAC) system, or a battery management system (BMS), typically require a lower voltage, so the battery voltage V1 is converted within work machine 100 to a lower DC voltage V2, such as 550 VDC-700 VDC, for distribution on accessory bus 162. In this two-bus example, a higher voltage V3 received from an external source, namely, power rails 108 providing a voltage difference greater than 2500 VDC, such as 2700 VDC-2800 VDC, would be stepped down to match the battery voltage V1 and then joined into battery bus 160.

In another example, work machine 100 has three voltage buses—battery bus 160, accessory bus 162, and a traction bus 164. In this situation, the traction system may be configured to operate from voltage level V3 provided by power rails 108, i.e., at about 2700 VDC-2800 VDC. As a result, battery voltage V1 on battery bus 160 is stepped up to match voltage level V3, i.e., traction voltage V3 on traction bus 264. Thus, in this example, traction bus 164 carries about 2700 VDC-2800 VDC, while battery bus 160 carries battery voltage V1 of about 750 VDC-1500 VDC, and accessory bus 162 carries a lesser voltage V2 of about 550 VDC-700 VDC. The voltages for each of these buses are exemplary only and other voltage values and ranges may be adopted without departing from the principles of this disclosure.

In some examples, work machine 100 includes one or more interfaces, such as charge port 166 and charge port 168, for receiving electrical energy from an external source to charge battery module 154. As discussed in further detail below, the external source may be a fast-charging circuit that can charge the battery module 154 in 20-30 minutes, for example, when work machine 100 is stationary. Charge port 166 and charge port 168 are coupled to battery bus 160 to provide, separately or together, sufficient charging current from the external source at battery voltage V1 while work machine 100 is out of service.

Figure 2:
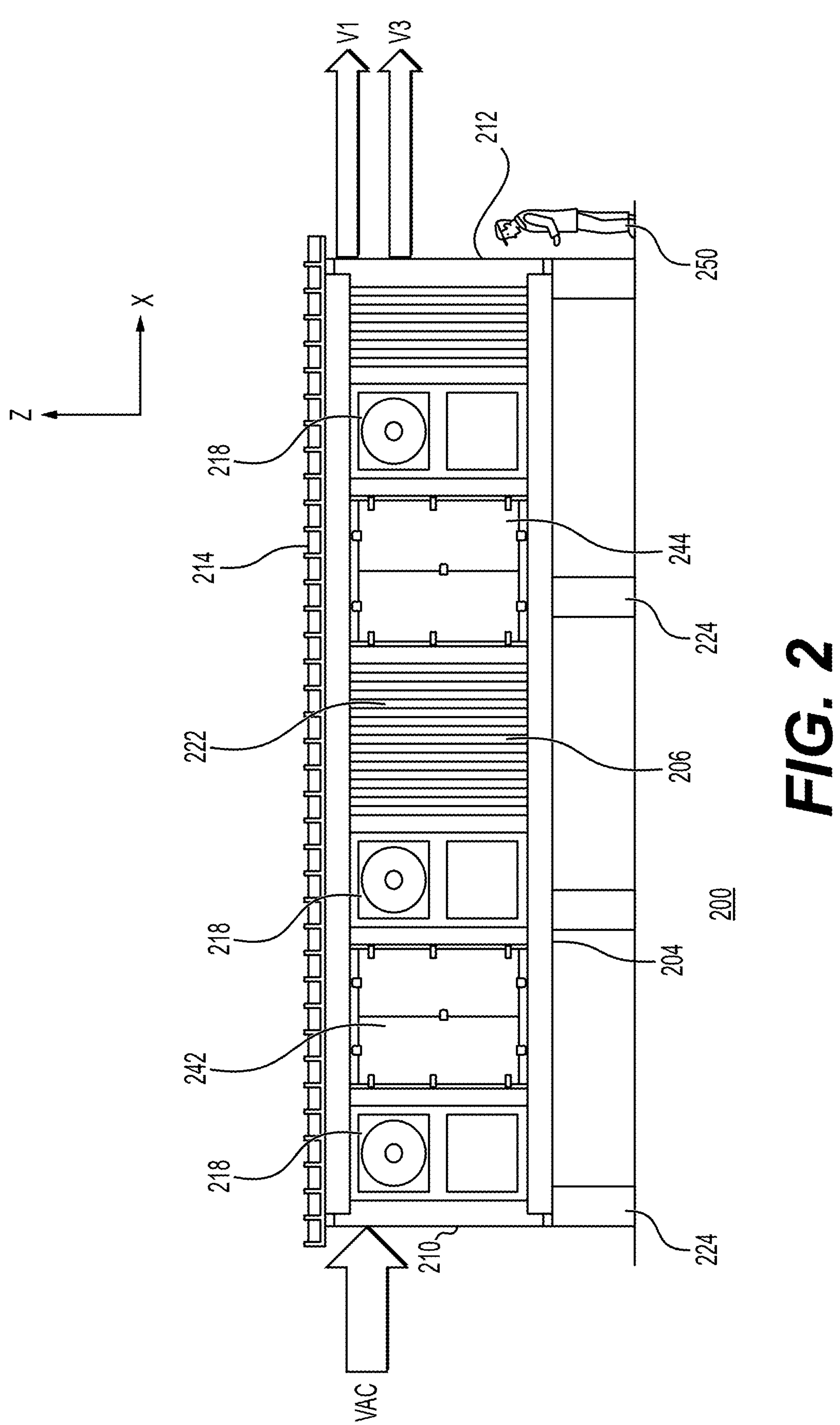
FIG. 2 is a front-side view of portable electrical substation in accordance with an example of the present disclosure.

While FIG. 1 provides an overview of work machine 100, FIG. 2 is an isometric view of a generalized substation 200, or power module, for transferring electrical energy to work machine 100 as one example suitable for carrying out the principles discussed in the present disclosure. In one configuration, substation 200 provides DC electrical energy for powering electric engine 102 to cause movement of work machine 100, such as by providing voltage V3 to work machine 100 via power rails 108. In another configuration, substation 200 provides DC electrical energy for charging battery module 154 while work machine 100 is stationary, such as by providing voltage V1 to work machine 100 via one or more of charge ports 166 and 168.

As illustrated in FIG. 2, a substation 200, or configurable power module, in some examples includes an external structure with walls and a roof to protect its equipment from the environment and to protect personnel from hazardous voltages. The substation 200 receives AC voltage from an external source (not shown), such as AC distribution power denoted VAC as an input in FIG. 2, and transforms and conditions that AC voltage into different levels of DC voltage, such as outputs V1 and V3 in FIG. 2. The converted DC voltages are then provided for use by a load (not shown), such as work machine 100.

Substation 200 may be located in any environment requiring DC distribution voltage, particularly situations in which the substation may be periodically commissioned, decommissioned, and relocated. Substation 200 is essentially self-contained and suited for environments where electrical equipment and related resources may otherwise be lacking. In some examples, the environment for substation 200 is a mine site or a logging site in a remote location, and the load is work machine 100 powered by the DC voltage to haul a load. In other implementations, the heavy work machine need not haul a load and may be any machine associated with various industrial applications including, but not limited to, mining, agriculture, forestry, construction, and other industrial applications.

As illustrated in FIG. 2, substation 200 is cuboid in shape, although other forms for substation 200 are possible depending on the implementation. The exterior structure includes a base 204, front wall 206, a rear wall on the opposite side, first end wall 210, second end wall 212, and roof 214. One or more doors within the walls of substation 200 provide access to the interior of the structure, such as first side door 242 and second side door 244. Due to heat generated by electrical equipment within substation 200 described below, several air-conditioning units 218 cool the interior and may form part of one or more walls, as with front wall 206 in FIG. 2. Otherwise, panels 222 form an exterior structure within the walls to conceal and prevent access to the interior. In some examples, substation 200 is elevated from ground by support structures, indicated in FIG. 2 as blocks or piers 224. Piers 224 may be of any shape or composition and serve to hold substation 200 above the ground. In some examples, piers 224 are about 1.0 meter in height. As a result, personnel, such as operator 250 in FIG. 2, may have to climb and crawl into substation 200 or employ a ladder or similar lift to enter, limiting access through the doors and increasing worker safety from accidental arcing.

In some examples, substation 200 is a modular and portable structure. To facilitate shipment, substation 200 is intended to have an external size sufficient when assembled to fit within, i.e., to conform to the internal dimensions of, a shipping container of standard size. In one example, a Series 1AAA standard "high cube" intermodal shipping container according to International Organization for Standardization (ISO) standard 668:2020, has a length of 40 feet (12.19 meters), a width of eight feet (2.44 meters), and a height of 9.6 feet (2.5 meters). As a result, substation 200 may be loaded in one example into a shipping container conforming to ISO 668:2020, shipped to a location within a work site, unloaded, and configured for operation with minimal additional parts or setup activities. Similarly, substation 200 may be decommissioned from the location and readily moved intact to a new destination, such as another location within the site as work evolves. Shipping containers of other sizes and standards are also possible for transporting substation 200 based on the size and electrical performance of the equipment and the logistics of moving substation 200 between locations.

Substation 200 may supply one or more of V1 and V3 through electrical conductors coupled to work machine 100. In some examples, substation 200 receives an AC voltage input VAC generally in the range of 11 kV to 33 kV three-phase AC electricity at 50 Hz or 60 Hz from an external source such as an AC medium-voltage distribution line. In one mode, in which the substation functions as an Energy Transfer Unit (ETU), the substation 200 may transform and convert the AC voltage input to a DC voltage output V1 of up to 1500 VDC at about 4800 A of current at about 6 MW of power, which may be used to charge batteries of a stationary vehicle. In this situation, substation 200 may operate as a current source and provide stable electrical current at voltage V1 to one or both of charge ports 166 and 168 through cables or similar conductors while work machine 100 is out of service. In another mode, the substation may provide Dynamic Energy Transfer (DET) to a vehicle in motion, transforming the AC voltage input to a DC voltage output V3 of up to 3000 VDC at about 3600 A of current and about 6 MW of power. In this situation, substation 200 can operate as a voltage source and provide stable electrical voltage at V3 (or in some implementations, at V1) to power rails 108, which may be accessed by contactors 118 on work machine 100. It should be noted that the AC voltage input ranges and/or the DC voltage output ranges are examples, and the present disclosure contemplates other suitable values of the AC voltage input and/or the DC voltage output.

Figure 3:
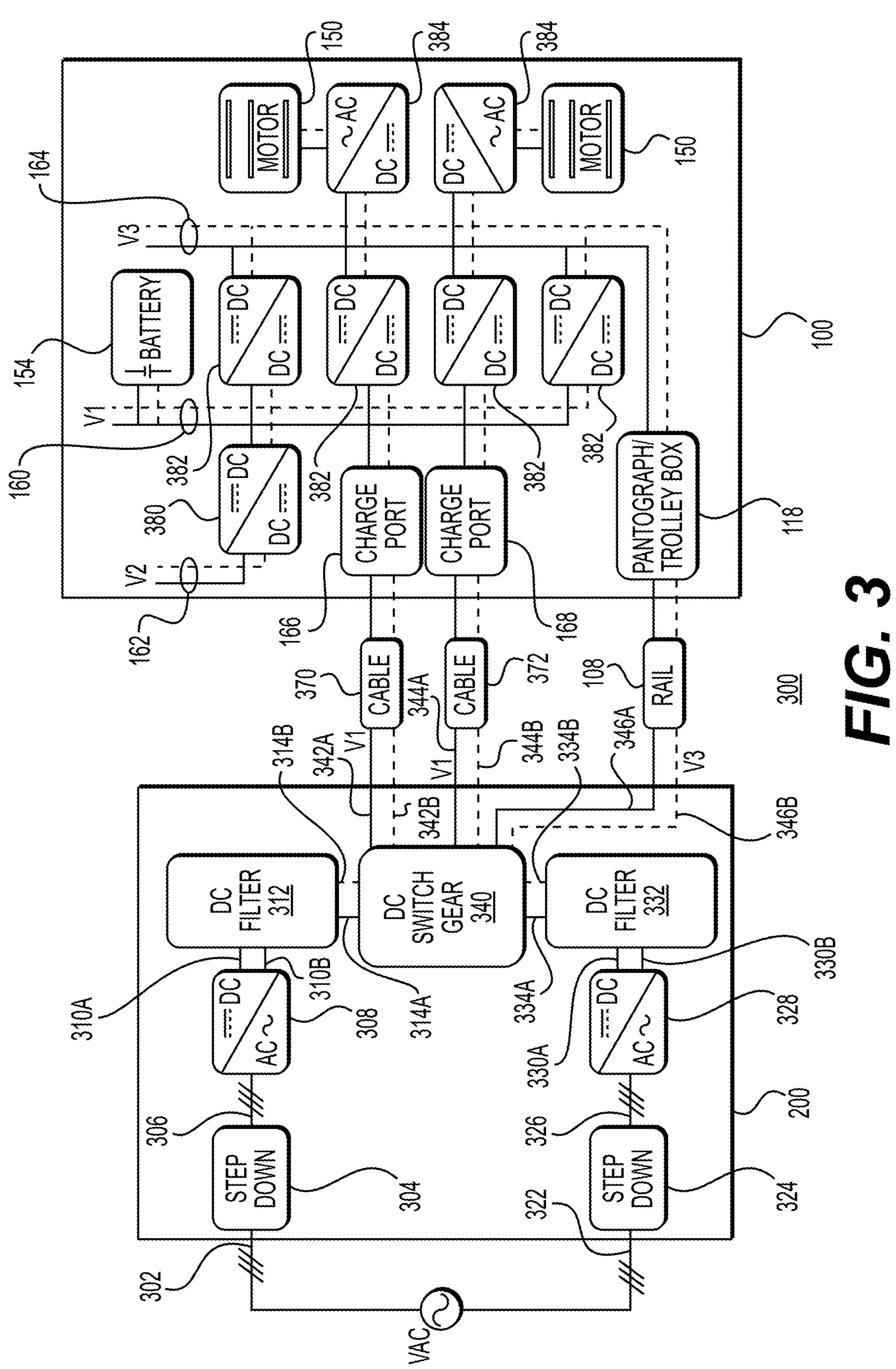
FIG. 3 is a functional block diagram of an electrical system formed by the connection of the substation of FIG. 2 with a work machine of FIG. 1 in accordance with an example of the present disclosure.

FIG. 3 is a functional block diagram of an electrical system 300 formed by the connection of substation 200, on the left, with work machine 100, on the right. The left side of FIG. 3 depicts the general architecture of substation 200 for operating selectively in either a first voltage-source mode for powering (i.e., DET) or a second current-source mode for charging (i.e., ETU). In general, the relevant aspects of substation 200 include a parallel arrangement of step-down transformers, AC/DC voltage converters, and DC filters, that feed into DC switchgear for selecting the appropriate mode of operation. At first AC input 302, substation 200 receives an AC voltage input labeled VAC generally in the range of 11 kV to 33 kV three-phase AC electricity at 50 Hz or 60 Hz from an external source such as an AC medium-voltage distribution line. First AC input 302 may typically include AC switchgear as a collection of components configured for receiving, disconnecting, and otherwise switching lines with AC input voltage received from the AC medium-voltage distribution line. This AC switchgear (not shown) provides input-side protection for the system and personnel, for example, to detect against ground faults detected on the AC voltage side, to react to a potential transformer overtemperature condition, and to perform other detections and deenergizing of components at the AC input portion of the substation.

When substation 200 is operating, first AC input 302 provides a closed electrical path for providing the AC voltage from the medium-voltage distribution line to primary windings of a first transformer 304. The first transformer 304 is a step-down transformer having primary windings for receiving three-phase AC voltages at various primary taps ranging from, for example, 11 kV to 33 kV and having secondary windings for producing corresponding three-phase AC voltages at various secondary taps. First transformer 304 provides its three-phase secondary voltage as first step-down voltage 306 to one or more inputs of a first rectifier 308.

The first rectifier 308 may be a collection of components configured to transform or convert first step-down voltage 306 to an equivalent DC voltage across first rectifier outputs 310. In some examples, first rectifier 308 is a controlled rectifier and is electrically coupled to at least the secondary windings of first transformer 304 and configured to generate a DC voltage output through rectification.

In some examples, the rectified DC voltage from first rectifier 308 is at least 1000V and upwards of about 1500V with a ripple, which is fed on first rectifier outputs 310 to first DC filter 312. First DC filter 312 is a lowpass filter, which may include inductors and capacitors, among other components, configured to remove ripple voltage remaining on the DC voltage generated by first rectifier 308. The smoothed DC voltage resulting from the filtering is passed from first DC filter 312 via first filtered outputs 314.

As illustrated in FIG. 3, a substantially similar, or in some cases identical, version of first transformer 304, first rectifier 308, and first DC filter 312 is provided in a parallel path from a second AC input 322. In particular, second AC input 322 feeds the AC voltage from the medium-voltage distribution line to primary windings of a second transformer 324, a second step-down voltage 326 enters a second rectifier 328 where the AC voltage is rectified, from which second rectifier outputs 330 feed the rectified voltage to second DC filter 332 to be smoothed. As with first DC filter 312, second DC filter 332 includes second filtered outputs 334 to output the smoothed DC voltage. First transformer 304 and first rectifier 308 may be termed a first power converter, and second transformer 324 and second rectifier 328 may be termed a second power converter.

Finally, a DC switchgear 340 within substation 200 receives the outputs from first DC filter 312 and second DC filter 332. DC switchgear 340 includes electrical components configured for receiving, disconnecting, outputting, and otherwise switching connections associated with first filtered outputs 314 and second filtered outputs 334. The components within the DC switchgear can include fast DC circuit breakers, such as those often used in the rail industry. As explained more depth for FIGS. 4 and 6, different arrangements of switches within DC switchgear 340, as well as adjustable busbars throughout substation 200, can combine or route the voltages and currents received from first filtered outputs 314 and second filtered outputs 334 to conductors leaving substation 200.

For instance, when selected as a current source to charge battery module 154 within work machine 100, DC switchgear 340 may be configured to provide output voltage of at least 1000 VDC and upwards of approximately 1500 VDC as V1 across each of second charging outputs 344 and powering outputs 346, while providing at least 2000 A and upwards of 4800 A and 6 MW collectively to work machine 100. As also shown in FIG. 3, in this current-source mode, charging voltage V1 may be provided from substation 200 to work machine 100 through first charging cable 370 and second charging cable 372. As shown, first charging cable 370 is coupled between first charging outputs 342 and charge port 166, while second charging cable 372 is coupled between second charging outputs 344 and charge port 168, with the cables collectively providing approximately 1500 VDC as voltage V1. Charge ports 166 and 168 may have any design and construction known to those of skill in the art sufficient to conduct the voltages and currents, as well as other possible signals, for charging battery module 154 using substation 200. In some options, as explained below, first charging cable 370 and second charging cable 372 could be consolidated into a single cable, or the charging current may be divided among more than two cables as desired. Within work machine 100, charge ports 166 and 168 receive the charging current from the cables and pass that current at voltage V1 to battery bus 160 for charging battery module 154 under the direction of battery controller 156 when the work machine is out of service or otherwise stationary. A DC/DC converter circuit 380 within the work machine may step down voltage V1 on battery bus 160 to voltage V2 for distribution on accessory bus 162, as discussed above.

Alternatively, when selected as a voltage source to power work machine 100, DC switchgear 340 may be configured to provide upwards of approximately 3000 VDC and 6 MW across powering outputs 346 as V3 for work machine 100 (or for some lower-powered systems, approximately 1500 VDC). In this voltage-source mode, powering voltage V3 may be provided from substation 200 to work machine 100 via power rails 108. Cables or other conductors may connect powering outputs 346 to power rails 108 to provide the voltage for contactor 118, or a similar pantograph, to receive voltage V3. Within work machine 100, interface equipment, such as a trolley box, receives the power from power rails 108 and may include various components for filtering transients that can occur when multiple machines use power rails 108. Work machine 100 passes voltage V3 through traction bus 164 to a traction system that includes, in some examples, two or more DC/AC converter circuits 384 that provide power to corresponding motors 150.

The electrical architecture within work machine 100 may include a series of DC/DC converter circuits 382 configured to serve as a bidirectional interface between battery bus 160 and traction bus 164. Through DC/DC converter circuits 382, power received from power rails 108 at voltage V3 may be stepped down to voltage V1 and delivered to battery bus 160, such that battery module 154 may be charged while the work machine is in motion. Conversely, power from battery module 154 at voltage V1 may be stepped up to voltage V3 on traction bus 164, such that battery module 154 may cause movement of the work machine when contactor 118 is detached from power rails 108, for instance.

Figure 4:
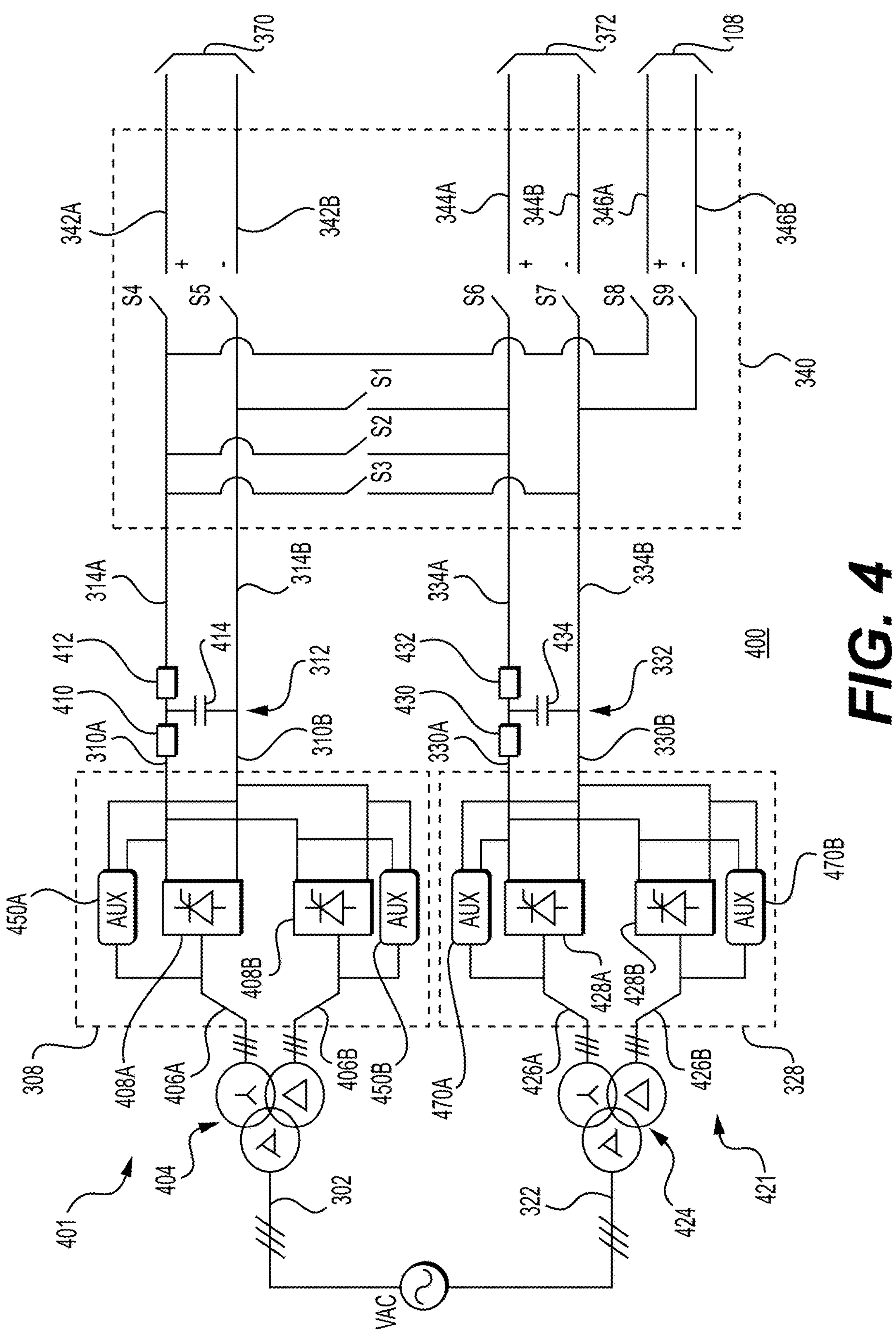
FIG. 4 is a schematic diagram of a first option for the electrical substation of FIG. 2 in accordance with an example of the present disclosure.
Figure 6:
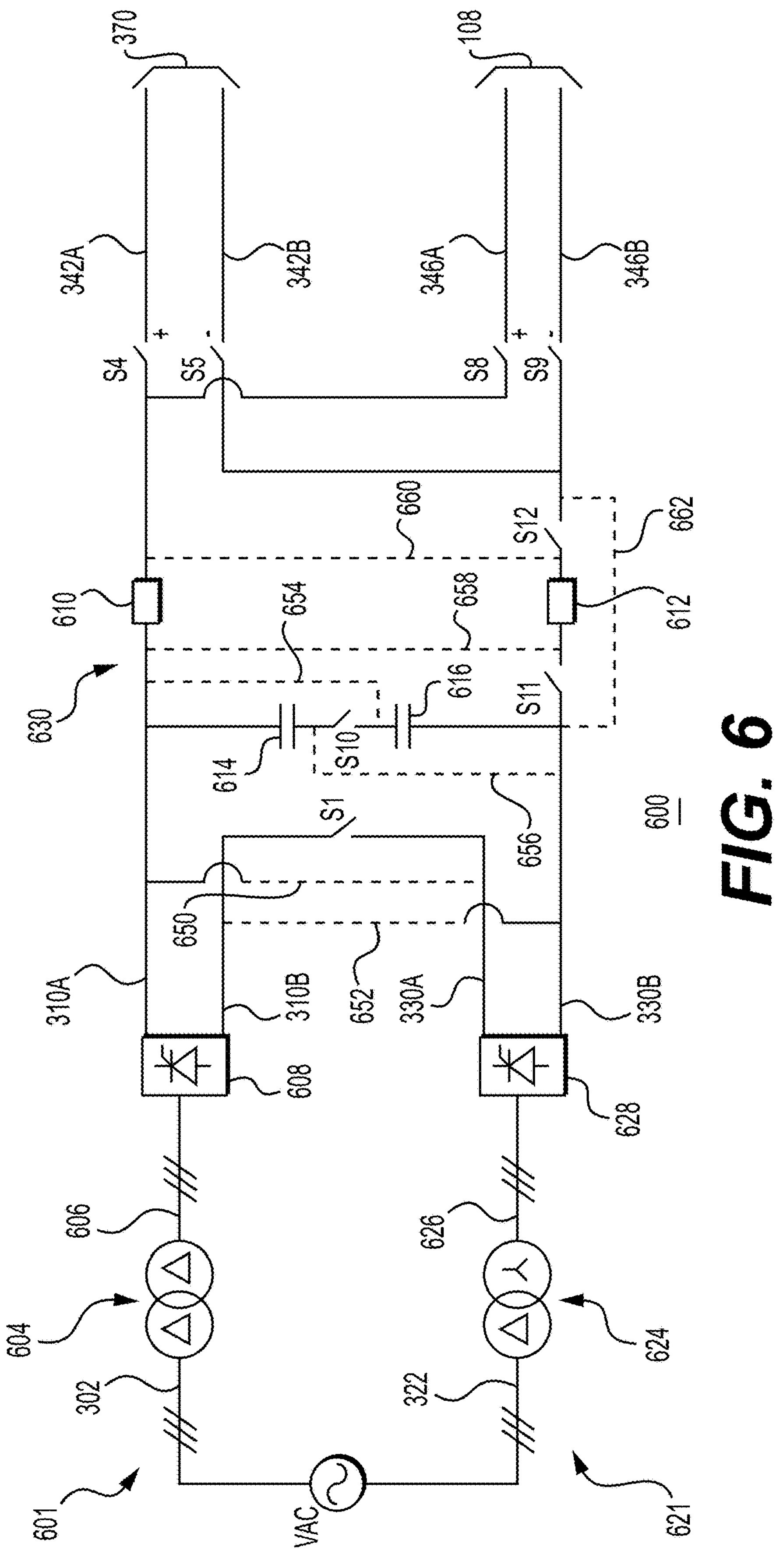
FIG. 6 is a schematic diagram of a second option for the electrical substation of FIG. 2 in accordance with an example of the present disclosure.

While FIG. 3 illustrates a functional block diagram for connecting substation 200 for either powering or charging work machine 100, FIGS. 4 and 6 provide examples for implementing substation 200 to operate in these two modes within physical, thermal, and electrical constraints of a portable, high-power substation. FIG. 4 is a schematic diagram 400 of a first option for substation 200 of FIG. 3 using parallel paths of three-winding, three-phase transformers and a single stage of rectifier units.

Referring to FIG. 4, a schematic diagram 400 includes a parallel arrangement of a top leg 401 with a first power converter and a bottom leg 421 with a second power converter. On top leg 401, at first AC input 302, first transformer 304 is implemented with a delta-wye-delta transformer 404. Delta-wye-delta transformer 404 is a three-phase transformer having primary windings for receiving three-phase medium voltage VAC at various primary taps ranging from, for example, 11 kV to 33 kV and having secondary windings for producing corresponding three-phase AC voltages at various secondary taps, such as 1.2 kVAC as transformer outputs 406. In one example, this first transformer 304 is configured to generate 1.2 kVAC at each of its secondary windings at a continuous power rating of 6.5 MVA, generally operable at a power capability of about 7.5-10 MW.

The transformer in top leg 401 has a primary-side winding in a delta configuration and two secondary-side windings, one in a delta configuration and another in a wye configuration. In this arrangement, delta-wye-delta transformer 404 will produce a first set of stepped-down, three-phase waveforms corresponding to VAC at transformer output 406B across a delta-delta winding configuration, as shown in FIG. 4. The delta-wye-delta transformer 404 will also produce at transformer output 406A a second set of stepped-down, three-phase waveforms from VAC across a delta-wye winding configuration. The three-phase waveforms at the delta-delta transformer output 406B may be phase shifted with respect to the three-phase waveforms at the delta-wye transformer output 406A by 30 degrees. These six waveforms are then fed into first rectifier 308 for conversion into a DC voltage.

As embodied in the example of FIG. 4, first rectifier 308 is a parallel combination of two six-pulse rectifier units 408, forming a 12-pulse topology. Particularly, transformer output 406B having a step-down voltage from VAC is provided to a six-pulse rectifier unit 408B, while transformer output 406A having a step-down voltage from VAC shifted by 30 degrees from transformer output 406B is provided to six-pulse rectifier unit 408A. In some examples, the six-pulse rectifier units 408 are high-power thyristor rectifier units formed from silicon-controlled rectifiers (SCRs) arranged in a bridge configuration. While other types of controlled rectifiers are possible, such as IGBT (insulated-gate bipolar transistor) rectifier units, thyristor rectifier units have higher efficiencies and lower thermal losses, which provide advantages for accomplishing high power density within condensed packaging as in substation 200 when operating at elevated input voltages such as 33 kVAC with DC voltage conversion. Specifically, operating more efficiently than other types of controlled rectifiers, thyristor rectifier units will require less cooling equipment within the substation, providing space within the substation for other equipment and enhancing the overall power density for the substation. Other approaches for obtaining rectification besides or in addition to thyristors may be employed with the goal of maximizing efficiency and, therefore, decreasing the cooling needs for the substation.

Figure 5:
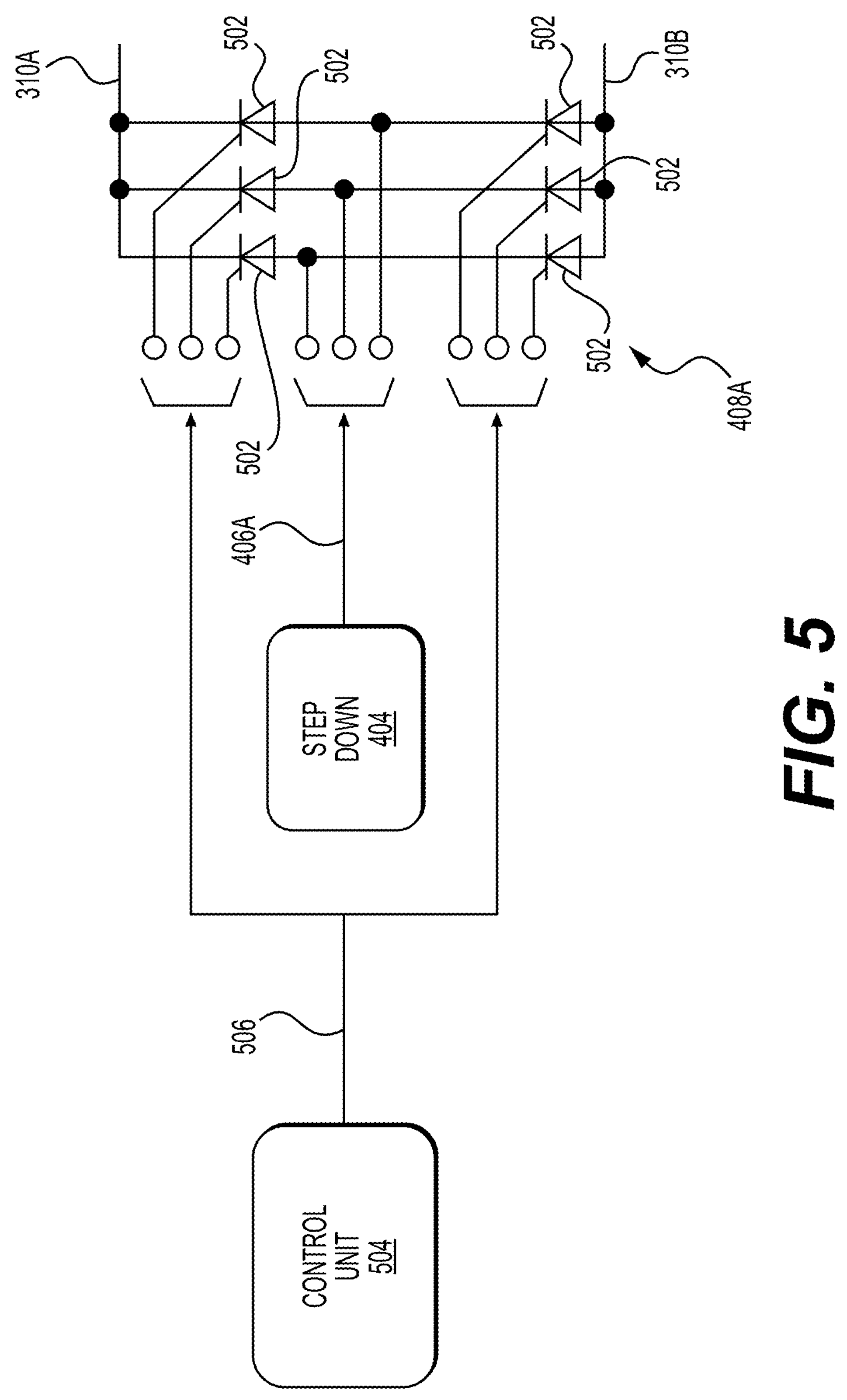
FIG. 5 is a schematic diagram of a representative six-pulse rectifier unit in accordance with an example of the present disclosure.

FIG. 5 illustrates more detail regarding one option for the six-pulse rectifier units 408, such as six-pulse rectifier unit 408A. As shown, six-pulse rectifier unit 408A may contain three series pairs of SCRs 502 connected in parallel to form a full-bridge rectifier. The three waveforms of transformer output 406A from delta-wye-delta transformer 404 are provided respectively to the junction of the cathode and anode of each of the pairs of SCRs 502.

SCRs 502 could be implemented using any technology suitable for handling electrical capacities consistent with the present disclosure, including several kilovolts and megawatts. For example, SCRs 502 could include phase control thyristor discs using free floating silicon technology for high voltage and high current applications. These devices may be configured to handle from 1200V to 6500V and 300 A to 4500 A, for instance. The thyristor discs could be arranged in parallel in some implementations to ensure a voltage rating is met. Each SCR may further include a snubber circuit (not shown) to help absorb voltage spikes and transients and a gating circuit (not shown) to handle the firing of the SCR. While the use of SCRs rated for megawatt capability enable charging and powering of heavy machinery such as work machine 100, different or other components may be selected when downscaling the principles of the present disclosure to a configurable power module operating at lower voltages and power levels.

Further, a control unit 504 within substation 200 provides control signals 506 to the gating circuits of the SCRs 502 for controlling their operation, such as the timing or firing angles for the rectifiers. As will be understood by those of skill in the field, control signals 506 may receive inputs regarding an environment in which six-pulse rectifier unit 408A is operating, such as characteristics of a load on substation 200, feedback from battery controller 156 or an electronic control module within work machine 100 indicating a state of charge for cells within battery module 154 or desired charging current provided by a battery management system, data relating to voltage or load on power rails 108, parameters for VAC, grid strength or a short circuit ratio for the electrical grid providing VAC, and other factors. From these inputs, control unit 504 may determine an appropriate sequence of control signals 506 for SCRs 502 to compensate for differences between present and expected values and attain a DC voltage in a powering mode or a DC current in charging mode on first rectifier outputs 310 at desired levels with minimal ripple and noise.

In some examples, control unit 504 may include one or more controllers and/or microprocessors that may be associated with substation 200 and that may cooperate in controlling various functions and operations of the configurable power module. The functionality of control unit 504 may be implemented in hardware and/or software without regard to the functionality. Control unit 504 may include or be coupled to a memory (not shown), which may store instructions or algorithms in the form of data, and a processing unit, which may be configured to perform operations based upon the instructions. The memory may be any suitable computer-accessible or non-transitory storage medium for storing computer program instructions, such as RAM, SDRAM, DDR SDRAM, RDRAM, SRAM, ROM, magnetic media, optical media and the like. The control unit 504 may be a single controller or multiple controllers working together to perform a variety of tasks. The control unit 504 may embody a single or multiple microprocessors, field programmable gate arrays (FPGAs), digital signal processors (DSPs), and/or other components configured to generate information useful for substation 200. Various known circuits may be associated with control unit 504, including power supply circuitry, signal conditioning circuitry, analog/digital conversion circuitry, actuator driver circuitry (i.e., circuitry powering solenoids, motors, or piezo actuators), and communication circuitry.

Returning to FIG. 4, six-pulse rectifier unit 408A provides a rectified DC voltage with ripple across first rectifier outputs 310. The six-pulse rectifier unit 408B, acting on a stepped-down voltage that is 30 degrees out of phase, similarly provides a rectified DC voltage with ripple that is out of phase with the rectified DC voltage from six-pulse rectifier unit 408A. As the outputs of six-pulse rectifier unit 408B are in parallel with the outputs of six-pulse rectifier unit 408A, the ripple voltages from the six-pulse rectifier units 408 are combined on first rectifier outputs 310.

Following first rectifier 308 in FIG. 4, first DC filter 312 helps eliminate ripple, harmonics, and other noise from the rectified voltage. In the example illustrated, first DC filter 312 is an LCL filter formed by an inductor 410 and an inductor 412 along first rectifier output 310A, and a capacitor 414 connected between the two inductors and first rectifier output 310B. The LCL filter is intended to function as a low-pass filter to help provide a more stable DC voltage for powering work machine 100 or charging cells within battery module 154. As such, the number, values, and placements of the inductors and capacitor(s) may vary based on the implementation. As well, while FIG. 4 separately illustrates filters for six-pulse rectifier unit 408A and six-pulse rectifier unit 408B, these two circuits may also be viewed as part of the same DC filter. In this perspective, the capacitors and inductors within schematic diagram 400 function collectively as a DC, or low-pass, filter for different inputs provided to it, such as from first rectifier outputs 310 and second rectifier outputs 330.

In one example, the combined inductance for one of the first DC filter 312 or second DC filter 332 may be in the range of 1 mH, while the capacitance may be in range of 10 mF. For instance, inductor 410 and inductor 412 may each have an inductance of about 0.25 mH, providing a total inductance of 0.5 mH when combined in series. Air core inductors may be used to provide lower weight, lower heat dissipation, and superior performance during any short circuit event than iron core inductors. For capacitance, two banks of 2 mF capacitors may be used to provide a total of 4 mF when combined in parallel.

As shown in FIG. 4, first rectifier 308 and second rectifier 328 provide a single stage of rectification that is further filtered and smoothed by first DC filter 312 and second DC filter 332. Sufficiently stable output voltages and currents at megawatts of power may be obtained without additional rectification circuitry, such as a chopper bridge, that is often used in conventional power supplies that convert lower voltages and currents. Accordingly, the number of components required for substation 100 as shown in FIG. 4 may be minimized to enable the circuitry to fit within a relatively small footprint, such as a shipping container conforming to ISO 668:2020, despite the relatively large sizes inherent in devices that are rated to handle megawatts of power.

The substation 200 of FIG. 4 further includes a bottom leg 421 that is substantially identical to top leg 401. Namely, at second AC input 322, second transformer 324 is implemented with a delta-wye-delta transformer 424. As with the transformer in top leg 401, delta-wye-delta transformer 424 is three-phase transformer suitable for converting medium voltage VAC, such as 11 kV to 33 kV, into voltages such as 1.2 kVAC as transformer outputs 426. Further, the transformer in bottom leg 421 has a primary-side winding in a delta configuration and two secondary-side windings, one in a delta configuration and another in a wye configuration. Accordingly, delta-wye-delta transformer 424 produces a first set of stepped-down, three-phase waveforms corresponding to VAC from second AC input 322 at transformer output 426B across a delta-delta winding configuration, and a second set of stepped-down, three-phase waveforms phase shifted by 30 degrees with respect to transformer output 426B across a delta-wye winding configuration onto transformer output 426A. Moreover, the transformer outputs 426 of delta-wye-delta transformer 424 may be phase shifted by 15 degrees with respect to corresponding transformer outputs 406 of delta-wye-delta transformer 404. Thus, transformer output 426A may have a phase shift of 15 degrees with respect to transformer output 406A, and transformer output 426B may have a phase shift of 15 degrees with respect to transformer output 406B. These six waveforms are then fed into second rectifier 328 for conversion into a DC voltage.

The phase shifts generated within and between delta-wye-delta transformer 404 and delta-wye-delta transformer 424 can help minimize harmonics and other noise in the eventual output from substation 200. The phase shift of 30 degrees between the secondary and tertiary windings of the respective transformers, for example, can help cancel the $6^{th}$ harmonic of the transformed voltage when rectified. The phase shift of 15 degrees between corresponding windings of the two transformers, such as between the delta-delta configurations at transformer output 406B and transformer output 426B, can help cancel the $12^{th}$ harmonic of the transformed voltage when rectified and combined as described below.

As in first rectifier 308, second rectifier 328 is a parallel combination of two six-pulse rectifier units 428. In some examples, six-pulse rectifier unit 428A and six-pulse rectifier unit 428B are respectively embodied as six-pulse controlled rectifiers as illustrated in FIG. 5 and discussed above for six-pulse rectifier unit 408A, culminating in a 12-pulse controlled rectifier. Returning to FIG. 4, six-pulse rectifier unit 408A provides a rectified DC voltage with ripple across second rectifier outputs 330. The six-pulse rectifier unit 428B, acting on a stepped-down voltage that is 30 degrees out of phase, similarly provides a rectified DC voltage with ripple that is out of phase with the rectified DC voltage from six-pulse rectifier unit 428A. As the outputs of six-pulse rectifier unit 428B are in parallel with the outputs of six-pulse rectifier unit 428A, the ripple voltages from the six-pulse rectifier units 428 are combined on second rectifier outputs 330.

Following second rectifier 328 in FIG. 4, second DC filter 332 helps eliminate ripple, harmonics, and other noise from the rectified voltage. As with first DC filter 312, second DC filter 332 in the example illustrated is an LCL filter formed by an inductor 430 and an inductor 432 along second rectifier output 330A, and a capacitor 434 connected between the two inductors and second rectifier output 330B. Other formations for DC filter 312, such as a CL, LC, RLC, or other arrangement, may be used based on the implementation and other factors determinable by those skilled in the field. The LCL filter illustrated is intended to function as a low-pass filter to help provide a more stable DC voltage for powering work machine 100 or charging cells within battery module 154. As with first DC filter 312, second DC filter 332 in one example may apply an inductance in the range of 1 mH and a capacitance in the range of 10 mF. The number, values, and placements of the inductors and capacitor(s) may vary based on the implementation.

Further to the discussion above for FIG. 3, DC switchgear 340 may include a collection of switches to configure top leg 401 and bottom leg 421 so that substation 200 operates either as a current source, i.e., in a charging mode for supplying current to charge battery module 154, or as a voltage source, i.e., in a powering mode for supplying voltage to power rails 108 to energize motors 150. As illustrated in the example of FIG. 4, these switches may include switches S1-S9, which may be set manually or remotely to select one of at least four operating modes.

In a first mode, substation 200 may be configured to operate as a current source by providing charging current on one or both of first charging cable 370 and second charging cable 372. In this mode, substation 200 may be configured to operate as two independent megawatt chargers. To do so, switches S1-S3 remain open as shown in FIG. 4, maintaining separation between top leg 401 and bottom leg 421. Further, switches S8 and S9 would remain open so that powering outputs 346 to power rails 108 remain isolated. For operating only one of top leg 401 or bottom leg 421, either S4 and S5 would be closed to activate first charging cable 370 or S6 and S7 would be closed to activate second charging cable 372. In some situations, the two chargers may independently charge different batteries on two stationary work machines through first charging cable 370 and second charging cable 372. For operating both top leg 401 and bottom leg 421, switches S4-S7 would be changed from their open position shown in FIG. 4 to a closed position, connecting first filtered outputs 314 to first charging outputs 342 and to first charging cable 370 and connecting second filtered outputs 334 to second charging outputs 344 and to second charging cable 372. In these configurations, with an input of three-phase medium voltage VAC of, for example, 11 kV to 33 kV, top leg 401 and bottom leg 421 each may provide a voltage on first charging cable 370 and second charging cable 372, respectively, of up to approximately 1500 VDC and current of up to approximately 2400 ADC at a power of at least 1 MW and up to 3 MW.

The two independent chargers within substation 100 may also be arranged to simultaneously charge the batteries within the same stationary work machine 100. In this setup, switches S1-S3 would remain open, while switches S4-S7 would be changed from their open position shown in FIG. 4 to a closed position, connecting first filtered outputs 314 to first charging outputs 342 and to first charging cable 370 and connecting second filtered outputs 334 to second charging outputs 344 and to second charging cable 372. After passing through charge port 166 and charge port 168 on work machine 100, the voltage and current at these ports could be combined on battery bus 160 (FIG. 3), effectively connecting first filtered outputs 314 of top leg 401 and second filtered outputs 334 of bottom leg 421 in parallel. The two independent chargers within substation would therefore be capable of collectively supplying approximately 1500 VDC (i.e., V1) at a combined current of up to 4800 ADC on battery bus 160 with up to 6 MW of power for charging cells within battery module 154.

In a second charging mode, substation 200 may be configured to operate as a current source by providing the combined current output from top leg 401 and bottom leg 421 on a single cable. To do so, switch S1 would remain open, but switches S2 and S3 would be closed. This change from FIG. 4 would connect first filtered outputs 314A with second filtered output 334A and first filtered outputs 314B with second filtered output 334B, which would combine top leg 401 and bottom leg 421 in parallel. In this example, substation 200 would function as a single 24-pulse megawatt charger. The parallel combination would enable substation 200 to supply approximately 1500 VDC (i.e., V1) at a combined current of up to 4800 ADC from the substation. With switches S8 and S9 remaining open, either switches S4 and S5 could be closed, providing the combined current on first charging cable 370, or switches S6 and S7 could be closed, providing the combined current on second charging cable 372, as desired.

In some examples, when operating in either charging mode, substation 200 may accomplish bulk charging of battery module 154 by providing a majority of the charging capacity in a short amount of time. For instance, substation 200 may be able to increase the state of charge for the batteries in work machine 100 to about 80% of capacity in 20-30 minutes, much more quickly than for the last 20% of capacity. Accordingly, in some examples, substation 200 may include auxiliary chargers 450 within first rectifier 308 and auxiliary chargers 470 within second rectifier 328 to bolster the charging capacity as needed.

The auxiliary chargers can be low in power compared to the SCRs (e.g., a magnitude of kW) and can be implemented using any applicable technology and configuration known to those skilled in the art. For instance, while illustrated in FIG. 4 as being between the input and outputs of each SCR, auxiliary chargers 450 could be implemented in many other ways, such as being connected either in parallel or in series with the SCRs, on the AC input side of the SCRs, on the DC output side of the SCRs, or in various combinations of these configurations as appropriate for bolstering the state of charge in a particular implementation. Auxiliary chargers 450 and auxiliary chargers 470 could be implemented using insulated-gate bipolar transistors (IGBTs), metal-oxide semiconductor field effect transistors (MOSFETs), or similar components to provide, in some examples, from 2-10% of charging power of the charge provided by the SCRs. In other implementations, such as shown in FIG. 6 and discussed below, the optional auxiliary chargers may not be necessary to achieve full or near-full charging capacity in a short period of time.

In these examples for operating substation 200 in current-source modes, substation 200 may use feedback from a battery management system within work machine 100 about charging data such as a state of charge or desired current demand over time to adjust the current provided for charging. For instance, responsive to feedback from the battery management system or other control apparatus at the work machine, control unit 504 within substation 200 may modify control signals 506 within six-pulse rectifier units 408 or six-pulse rectifier units 428 and/or tap settings within delta-wye-delta transformer 404 or delta-wye-delta transformer 424 to change a voltage setpoint for the relevant charger.

Doing so would cause an amount of current to flow differently over time from either top leg 401 or bottom leg 421 within substation 100 in accordance with a charging profile for the batteries being charged.

In a third operating mode for substation 200, top leg 401 and bottom leg 421 may be configured to operate together as a voltage source for power rails 108 to provide voltage V3. To do so, switch S1 in FIG. 4 would be closed while switches S2 and S3 remain open. Consequently, first filtered outputs 314B and second filtered output 334A will become connected, combining top leg 401 and bottom leg 421 in series. The voltage drop across first filtered outputs 314A and second filtered output 334B will, therefore, become a combination of the two legs to provide up to approximately 3000 VDC. With switches S4, S5, S6, and S7 remaining open, switches S8 and S9 could be closed, providing this combined voltage of 3000 VDC and a current approximating 2400 ADC across powering outputs 346 and onto power rails 108.

First filtered outputs 314 and second filtered outputs 334 may be referenced to ground in any manner suitable for the implementation. For instance, in one option, first filtered output 314B and second filtered output 334A may be grounded through an impedance (not shown in FIG. 4), such that top leg 401 provides a voltage at first filtered output 314A relative to ground of up to approximately +1500 VDC, while bottom leg 421 provides a voltage at second filtered output 334B relative to ground of up to approximately −1500 VDC. With the closing of switches S8 and S9, +1500V would be available on powering output 346A and −1500V would be available on powering output 346B for power rails 108.

Therefore, in this example, substation 200 would function as a single 24-pulse voltage source with combined capacity of up to 3000 VDC at a single output. In some examples, upon receiving feedback about the voltage level on power rails 108 or the voltage output from substation 200, control unit 504 may modify control signals 506 within six-pulse rectifier units 408 and six-pulse rectifier units 428 and/or modify tap settings within delta-wye-delta transformer 404 and delta-wye-delta transformer 424 to change or maintain a voltage setpoint based on the load, changing an amount of voltage provided to power rails 108 based on the load.

In a fourth powering mode for substation 200, top leg 401 and/or bottom leg 421 may be configured to operate as a voltage source to supply 1500 VDC to a dynamic energy transfer system functioning at that level. While the present disclosure uses an example of powering and charging a heavy machine, such as work machine 100 operating as a large mining truck at up to 3000 VDC and at 6 MW, other machines may operate at lower voltage and power, such as at 1500 VDC and 3 MW. To accommodate these systems, substation 200 may be configured to provide 1500 VDC in a voltage-source mode as needed. For example, substation 200 of FIG. 4 may be configured to operate as a current source in the manner described above for the first and second operating modes, except the switches may be configured to transfer voltage of 1500 VDC through powering outputs 346 rather than to first charging outputs 342 or second charging outputs 344. In one arrangement, switch S1 would remain open but switches S2 and S3 would be closed, connecting top leg 401 and bottom leg 421 in parallel as in the second operating mode discussed above. Keeping switches S4-S7 open while closing switches S8 and S9 would provide 1500V between first filtered output 314A and second filtered output 334B onto powering outputs 346. Powering outputs 346 could then be provided to power rails 108 as shown in FIG. 4, or otherwise connected to an appropriate load for the 1500 VDC system. Alternatively, when configured to operate in the first operating mode discussed above having two independent megawatt chargers, schematic diagram 400 in FIG. 4 could be modified so that 1500 VDC available on either first filtered outputs 314 from first leg 401 or second filtered outputs 334 from second leg 421 are directed to powering outputs 346 to energize a 1500 VDC system external to substation 200.

In the example of FIG. 4, the configuration of first DC filter 312 and second DC filter 332 may permit the use of smaller and lower cost filter components. For a current-source mode of operation, capacitor 414 and capacitor 434 will each need to sustain the voltage drop across the outputs of a respective SCR unit, namely, up to 1500 VDC being output from first rectifier 308 for capacitor 414 and up to 1500 VDC being output from second rectifier 328 for capacitor 434. This 1500 VDC capability for the capacitors will be the same whether the substation is operated as two independent 3 MW megawatt chargers or combined in parallel to form a single 6 MW megawatt charger. When top leg 401 and bottom leg 421 are placed in series for a voltage-source mode, the available voltage from the substation rises to as high as 3000 VDC. However, the series combination of the legs will cause the 3000 VDC to be divided between first DC filter 312 and second DC filter 332. As a result, the same 1500 VDC voltage rating will suffice for the capacitors regardless of the operating mode for the substation. Using the same filter components for all operating modes and needing only the lower voltage capability, i.e., being rated for 1500V rather than 3000V, can provide several advantages, including minimizing the number of high-power devices needed within the space constraints of the substation and lowering material costs. Moreover, filter components with lower voltage ratings will generally be more available commercially and will cost less than those with higher ratings, such as 3000V.

As will be appreciated, the configuration of substation 200 as a current source or as a voltage source may be accomplished with an arrangement of switches different than illustrated in FIG. 4 for output of power onto one of first charging cable 370, second charging cable 372, and power rails 108, as appropriate. These switches, such as switches S1-S9, could be implemented as switches, removable busbars, or other devices within DC switchgear 340 or elsewhere within the substation, as desired.

FIG. 6 illustrates a schematic diagram 600 of a second option for substation 200 capable of being converted between a current source for charging and a voltage source for powering work machine 100. Among other features, FIG. 6 provides a simpler approach with fewer components than in FIG. 4, providing an opportunity to save space and further increase the power density for the substation.

The schematic diagram 600 illustrates a power source for work machine 100 using parallel paths, indicated as top leg 601 with a first power converter and bottom leg 621 with a second power converter, each composed of two-winding, three-phase transformers and a single stage of SCRs. Delta-delta transformer 604 is a three-phase transformer having primary windings for receiving three-phase medium voltage VAC at various primary taps ranging from, for example, 11 kV to 33 kV and having secondary windings for producing corresponding three-phase AC voltages at various secondary taps, such as 1.2 kVAC as transformer output 606. In the example shown, the transformer in top leg 601 has a primary-side winding in a delta configuration and a single secondary-side winding also in a delta configuration. As a result, delta-delta transformer 604 will produce a first set of stepped-down, three-phase waveforms corresponding to VAC at transformer output 606.

On bottom leg 621, as with delta-delta transformer 604, delta-wye transformer 624 is a two-winding, three-phase transformer for receiving the same three-phase medium voltage VAC and producing corresponding three-phase AC voltages at various secondary taps as transformer output 626. In contrast to delta-delta transformer 604, however, transformer output 626 has a primary-side winding in a delta configuration and a single secondary-side winding in a wye configuration. As a result, the three phases of transformer output 626 will be phase-shifted by 30 degrees compared to the corresponding phases of transformer output 606.

In top leg 601 and bottom leg 621, the three-phase step-down voltages are respectively provided to first rectifier 308 and second rectifier 328, which are each implemented as a six-pulse silicon-control rectifier unit (SCR), labeled in FIG. 6 as six-pulse rectifier unit 608 and six-pulse rectifier unit 628. As discussed above and illustrated in FIG. 5, six-pulse thyristor rectifier units can provide voltage rectification with high efficiency and low thermal losses, providing advantages for accomplishing high power density within condensed packaging as in a modular substation. The six-pulse rectifier unit 608 may be implemented in any fashion suitable for the situation, such as with thyristor discs using free floating silicon technology as discussed above for FIG. 5. The six-pulse rectifier unit 608 provides a rectified DC voltage with a ripple as an output at first rectifier outputs 310 of approximately 1500 VDC. Similarly, six-pulse rectifier unit 628 provides voltage rectification to transformer output 626 to generate a rippled DC voltage of approximately 1500 VDC at second rectifier outputs 330.

As will be understood by those of skill in the field, as shown in FIG. 5, control signals 506 associated with six-pulse rectifier units 608, 628 may receive inputs regarding an environment in they are operating, such as characteristics of a load on substation 200, feedback from battery controller 156 or an electronic control module within work machine 100 indicating a state of charge for cells within battery module 154 or desired charging current provided by a battery management system, data relating to voltage or load on power rails 108, parameters for VAC, grid strength or a short circuit ratio for the electrical grid providing VAC, and other factors. From these inputs, control unit 504 may determine an appropriate sequence of control signals 506 for SCRs 502 to compensate for differences between present and expected values and attain a DC voltage in a powering mode or a DC current in charging mode on first rectifier outputs 310 at desired levels with minimal ripple and noise.

In the example of FIG. 6, reconfiguration of substation 200 between current-source and a voltage-source modes may occur not only by changing connections between top leg 601 and bottom leg 621 as in the example of FIG. 4, but also by changing connections between capacitors and inductors within a single DC filter 630. In this example, adjustable connections that may be set as closed or open for the two modes may be represented either as switches, as in FIG. 4, or as dashed lines representing, for example, busbars that may be installed or removed. In FIG. 6, to operate in a voltage-source mode, switch S1 is changed to be closed, while busbar 650 and busbar 652 are not installed. Thus, top leg 601 will be connected in series with bottom leg 621 via the joining of first rectifier output 310B with second rectifier output 330A. Coincident with that setting, switches S10, S11, and S12 are closed, and none of the remaining busbars in FIG. 6 is installed. As a result, a DC filter 630 is formed across first rectifier output 310A and second rectifier output 330B formed by a series connection of first capacitor 614 to second capacitor 616, first inductor 610 attached at one end to first rectifier output 310A, and second inductor 612 attached at one end to second rectifier output 330B.

The capacitors and inductors in FIG. 6 may have comparable values to those depicted in FIG. 4. Therefore, first inductor 610 and second inductor 612 may each provide an inductance on the order of 0.25 mH in one example, while first capacitor 614 and second capacitor 616 may each have a capacitance on the order of 2 mF in one example. Values for the inductance and capacitance may vary based on the implementation and performance of other components in the system, as can be derived with routine experimentation. In addition to the inductance and capacitance, the conductive lines associated with first capacitor 614 and second capacitor 616 may provide small values of resistance to the circuit. Accordingly, the DC filter 630 in FIG. 6 approximates a reconfigurable RCL filter. This filter helps remove ripple, harmonics, and other noise from the rectified voltage generated by six-pulse rectifier unit 608 and six-pulse rectifier unit 628 for use on power rails 108.

With the series connection of top leg 601 and bottom leg 621 in voltage-source mode, the combination of delta-delta transformer 604 and six-pulse rectifier unit 608 with delta-wye transformer 624 and six-pulse rectifier unit 628, filtered by the RCL filter, may provide a stable DC source of approximately 3000 VDC at 3600 ADC and 6 MW of power. To provide this electrical power to power rails 108, switches S4 and S5 would remain open, while switches S8 and S9 would be closed, joining first rectifier output 310A with powering output 346A and second rectifier output 330B with powering output 346B. As with FIG. 4, switches S4, S5, S8, and S9 could be implemented as part of DC switchgear 340, or they could be implemented elsewhere within substation 200 as switches, busbars, or other apparatus.

To operate substation 200 of FIG. 6 in a current-source mode, switch S1 is set in an open position, while busbar 650 is installed to connect first rectifier output 310A with second rectifier output 330A and busbar 652 is installed to connect first rectifier output 310B to second rectifier output 330B. As a result, the outputs of six-pulse rectifier unit 608 and six-pulse rectifier unit 628 will be connected in parallel for providing combined current at the output of the substation. Coincident with that setting, the components of the DC filter may also be converted to operate in a current-source mode. Switches S10, S11, and S12 would be set in an open position, and busbars 654, 656, 658, 660, and 662 would be installed within substation 200. With these connections, the RLC filter would be reconfigured such that first capacitor 614 and second capacitor 616 are positioned in parallel across first rectifier output 310A and second rectifier output 330B. As well, first inductor 610 and second inductor 612 would be connected in parallel with one end coupled to first rectifier output 310A and another end coupled to switch S4. Changing from current-source mode back to voltage-source mode would involve a reversal of the connections discussed above.

Similar to the discussion above for FIG. 4, the substation 200 depicted in schematic diagram 600 may also be configured to operate in a voltage-source mode for a 1500 VDC dynamic energy transfer system. In this arrangement, substation 200 would be configured as shown in FIG. 6 and as discussed above for a current-source mode. That is, switch S1 would remain open and busbar 650 and busbar 652 would be installed, coupling in parallel six-pulse rectifier unit 608 and six-pulse rectifier unit 628. Additionally, switches S10-

S12 would remain open, and busbars 654, 656, 658, 660, and 662 would be installed. However, switches S4 and S5 would remain open, while switches S8 and S9 would be closed, providing 1500 VDC to powering outputs 346 for energizing a system requiring that powering voltage.

In the illustrated example of FIG. 6, modifying switches S10, S11, and S12 and/or busbars associated with the capacitors and inductors will change the characteristics of the RLC filter while using the same components for both modes of operation. In some examples, these filter characteristics enable the use of components having a voltage or current rating that is less than the voltage and current capabilities of substation 200. For example, first capacitor 614 and second capacitor 616 may be selected to have a voltage rating sufficient for the maximum voltage in the current-source mode, i.e., 1500 VDC. As discussed above, in the current-source mode, first capacitor 614 and second capacitor 616 are connected in parallel and the voltage across first rectifier output 310A and second rectifier output 330B may reach 1500 VDC, which would be within the voltage rating for the capacitors. When converted to voltage-source mode, substation 200 may deliver up to 3000 VDC across first rectifier output 310A and second rectifier output 330B, but in this mode first capacitor 614 and second capacitor 616 are connected in series, as discussed above. Therefore, each capacitor would need to bear half of that voltage drop, or 1500 VDC, which again would be within the voltage rating for the devices. A consequence of this rearrangement of the capacitors in this example is that the capacitance of DC filter 630 in the current-source mode, when first capacitor 614 and second capacitor 616 are in parallel, would be greater than the capacitance in the voltage-source mode when the capacitors are in series.

A similar advantage may exist for the selection of first inductor 610 and second inductor 612. These inductors may be selected to have a current rating sufficient for the maximum current in the voltage-source mode, i.e., 2400 ADC, even though substation 200 has a higher current capability. As shown in FIG. 6 and discussed above, in the voltage-source mode, first inductor 610 and second inductor 612 are positioned in series with one of the output poles of the module, and the current from first rectifier output 310A or second rectifier output 330B may reach 2400 ADC, which would be within the current rating for the inductors. When converted to current-source mode, substation 200 may deliver up to 4800 ADC, but in this mode first inductor 610 and second inductor 612 are connected in parallel, as discussed above. Therefore, each inductor would need to pass half of that current, or 2400 ADC, which again would be within the current rating for the devices. A consequence of this rearrangement of the inductors in this example is that the inductance of DC filter 630 in the voltage-source mode, when first inductor 610 and second inductor 612 are in series with the output poles, would be greater than the inductance in the current-source mode when the inductors are in parallel.

The values for the inductors and the capacitors may be selected such that the shift in capacitance and inductance for DC filter 630 between the two modes of operation results in relatively consistent filter behavior for both modes. The ability to implement substation 200 with a single set of capacitors having a lower voltage capability, i.e., rated for 1500V rather than 3000V, and with single set of inductors having a lower current capability, i.e., rated for 2400 A rather than 4800 A, can provide several advantages, including minimizing the number of high-power devices needed within the space constraints of a substation and lowering material costs. Moreover, filter components with lower voltage and current ratings will generally be more available commercially and will cost less than those with higher ratings, such as 3000V or 4800 A. As will be appreciated, the configurable DC filter 630 may be implemented within the option of substation 200 depicted in FIG. 4 with slight modifications.

It will be appreciated that the components or modules within schematic diagram 400 of FIG. 4 and schematic diagram 600 of FIG. 6 may be supplanted or rearranged based on the particular implementation for substation 200 without departing from the principles of this disclosure. For example, while FIG. 6 illustrates switch S1 and busbars 650, 652 positioned before (i.e., upstream from) DC filter 630, in some examples switch S1 and busbars 650, 652 may be positioned after (i.e., downstream from) DC filter 630, similar to the arrangement shown in FIG. 4 for switches S1-S3 with respect to first DC filter 312 and second DC filter 332. Likewise, switches S1-S3 in FIG. 4 may be positioned before first DC filter 312 and second DC filter 332, similar to the switch/filter sequence shown in FIG. 6. The switches shown may also be replaced with busbars as desired, and vice versa. As well, while FIG. 4 depicts a fixed DC filter for each of top leg 401 and bottom leg 421, a single switchable filter as with DC filter 630 shown in FIG. 6 may alternatively be implemented for use by both top leg 401 and bottom leg 421 in FIG. 4. Similarly, the two fixed DC filters of FIG. 4 may be implemented instead in the circuit shown in FIG. 6, as desired.

Figure 7:
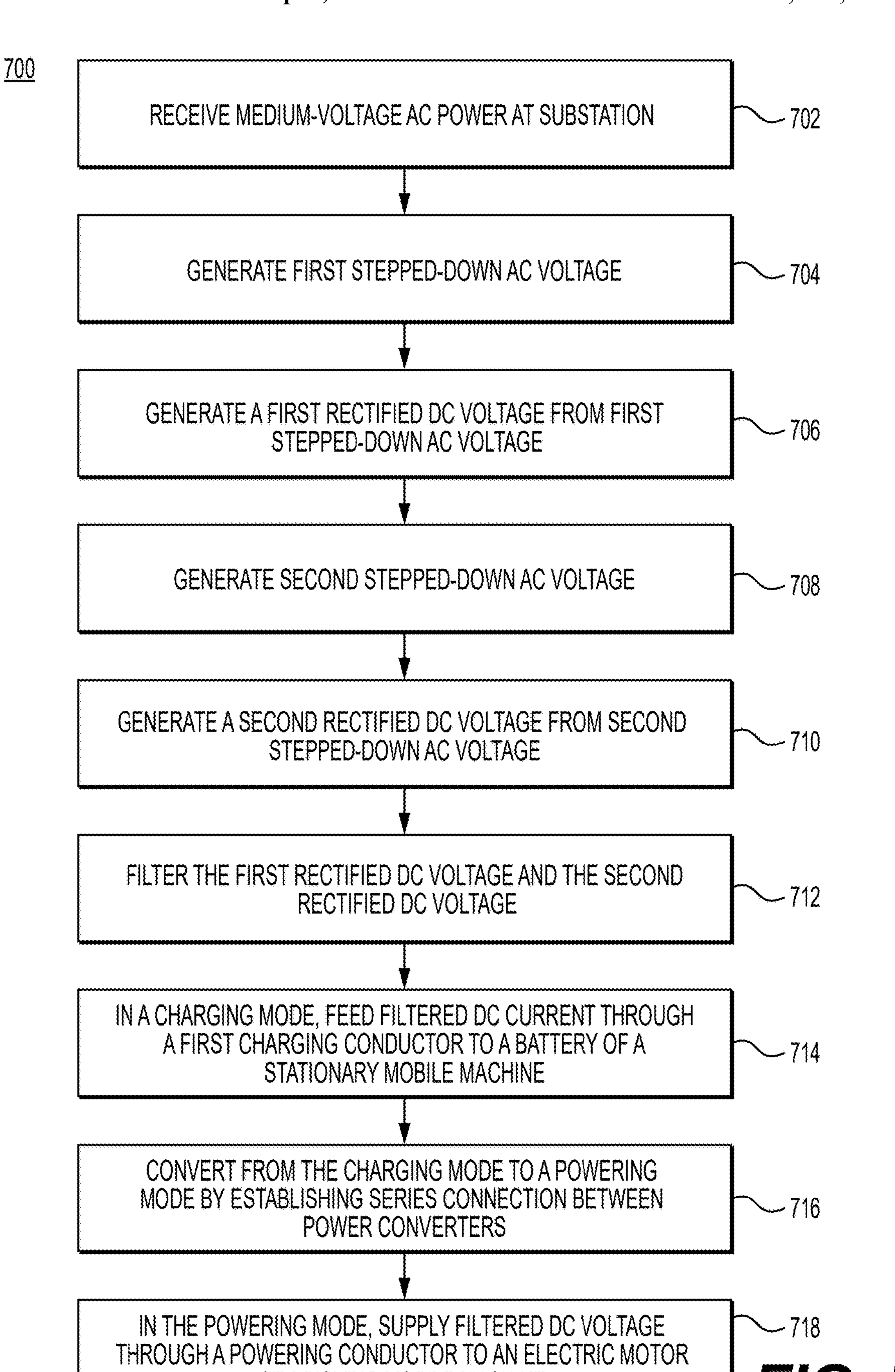
FIG. 7 is a flow chart depicting a method for operating and configuring an AC/DC substation between charging and powering modes in accordance with an example of the present disclosure.

Turning from the structure and operation of substation 200 and system 300 as illustrated in FIGS. 3-6 to a method involving these structures, FIG. 7 is a flowchart of a representative method for operating and configuring an AC/DC substation between charging and powering modes. The example method 700 is illustrated as a collection of steps in a logical flow diagram, which represents operations that can be performed in configuring the substation. The order in which the operations are described is not intended to be construed as a limitation, and any number of the described steps can be combined and performed in any order, in parallel, or simultaneously to implement the process.

Generally embodied as 700 in FIG. 7, the method begins with step 702 of receiving medium-voltage AC power at a substation from an external source. As explained above with respect to FIGS. 2-6, substation 200 may be connected to an external power grid that provides AC voltage at a medium-voltage level, such as ranging from 11-33 kVAC. Substation 200 may include AC switchgear at its input configured for receiving, disconnecting, and otherwise switching lines with AC input voltage received from the AC medium-voltage distribution line of the grid. As illustrated in the figures, the received AC voltage may be provided on two or more paths within substation 200, such as top leg 401, 601 and bottom leg 421, 621.

In a second step 704, the method includes generating a first stepped-down AC voltage from the received medium-voltage AC power. Generating the first stepped-down AC voltage may include stepping down the voltage using a three-phase transformer and, in some situations, phase shifting the stepped down voltage. In the example of FIG. 4, a delta-wye-delta transformer 404 having three windings may provide a step-down and a phase shift of the received voltage on its outputs. In the example of FIG. 6, a two-winding delta-delta transformer performs the step-down.

In step 706 of method 700, a first rectified DC voltage is generated from the first stepped-down AC voltage, which occurs by providing multi-pulse rectification on the stepped-down voltage. In the example of FIG. 4, two six-pulse rectifier units 408 connected in parallel form a 12-pulse rectification unit to provide the first rectified DC voltage on top leg 401. In another example, FIG. 6 illustrates one six-pulse rectifier unit 608 generating the first rectified DC voltage on top leg 601. The first rectified DC voltage may include a ripple on top of the voltage.

In steps 708 and 710, the acts of generating a stepped-down AC voltage and generating a rectified DC voltage are similarly performed for a second rectified DC voltage. In FIG. 4, a power converter including a delta-wye-delta transformer 424 within bottom leg 421 has three windings and may provide a step-down and a phase shift of the received AC voltage on its outputs that are fed to a pair of six-pulse rectifier units 428 connected in parallel to provide the second rectified DC voltage, as an example. Alternatively, in FIG. 6, a power converter including a two-winding delta-wye transformer may be used to provide a phase shift and step-down of the input voltage that is fed to a single six-pulse rectifier unit 628 to provide the second rectified DC voltage.

The first rectified DC voltage and the second rectified DC voltage are then filtered in a next stage 712. The DC filter may, in some examples, be an LCL filter or an RCL filter, as shown in FIGS. 4 and 6. The DC filter may be composed of a single set of capacitors and inductors servicing both legs of the substation, as in FIG. 6, or as two sets of capacitors and inductors with one for each of the two legs, as in FIG. 4.

In step 714, filtered DC current is fed through a first charging conductor to a battery of a stationary mobile machine in a charging mode of the substation. As discussed above for the example of FIG. 4, feeding the DC current may occur using at least one of the legs of the substation or using both legs of the substation connected in parallel. To accomplish the configuration, adjustable connectors in the form of switches, such as switches S1-S9, may be set to provide an appropriate path to a first charging cable 370 or a second charging cable 372. In some modes, feeding the filtered DC current may include setting an adjustable connector such as switches S2 and S3 or busbars 650 and 652 to combine the two legs of the substation in parallel.

The substation may then be converted from the charging mode to a powering mode by establishing a series connection of the power converters in a step 716. Adjustable connectors, such as switches S1-S9, may be set to connect the legs of the substation in a series combination and to access powering outputs 346 with the combined voltage of the power converters.

In some examples, converting from the charging mode to the powering mode may include reconfiguring the DC filter. As discussed above for FIG. 6, in a charging mode, first inductor 610 and second inductor 612 are arranged in parallel with one output pole of the substation within DC filter 630, while first capacitor 614 and second capacitor 616 are arranged in parallel. In converting to the powering mode, step 716 may include rearranging DC filter 630 using adjustable connectors so that first inductor 610 and second inductor 612 are respectively in series with the output poles of the substation, while first capacitor 614 and second capacitor 616 are in series across those output poles. Accordingly, inductors and capacitors with ratings lower than the power capacity of the substation may be used.

In step 718, in the powering mode, the filtered DC voltage is supplied through a powering conductor to an electric motor of a moving mobile machine. For example, the filtered DC voltage combined from top leg 601 and bottom leg 621 connected in series may be provided to powering outputs 346 by the setting of appropriate adjustable connections, such as switches S8 and S9. In some examples, supplying the voltage through a powering conductor may include providing the voltage from powering outputs 346 to power rails 108 to be conducted into work machine 100 via sliding contactor 118, as discussed above.

Those of ordinary skill in the field will appreciate that the principles of this disclosure are not limited to the specific examples discussed or illustrated in the figures. For example, while the configurable substation has been discussed in the context of fitting within a standard high-cube shipping container for portability, the described concepts are applicable beyond the constraints of that housing. Moreover, while the megawatt power converters are described for supplying voltage and/or current to a heavy work machine, other types of vehicles or equipment may benefit from the principles described and illustrated. As well, it will be understood that the power converter of the disclosed substation may be coupled to one or more additional substations to attain different output capacities as a group or to improve a quality of rectification for the voltage or current.

INDUSTRIAL APPLICABILITY

The present disclosure provides systems and methods for an electrical substation to transform AC voltage to DC voltage while being configurable between a current-source mode for charging batteries of a stationary work machine and a voltage-source mode for powering motors of a moving work machine. The substation receives medium-voltage AC power from a grid and includes a pair of megawatt DC power converters each formed from three-phase transformers, a single stage of silicon-controlled rectifier units, and a DC filter. Adjustable connectors enable combining the power converters in parallel or keeping them separate to operate in the current-source mode for charging the machine batteries. The connectors further enable combining the power converters in series to operate in the voltage-source mode for powering the machine motors or keeping them separate to provide power at half the voltage. The substation may be sized to fit within a standard high-cube ISO shipping container to enhance its portability, and its minimal components provide versatile functionality with high power density and a low cost per kilowatt.

As noted above with respect to FIGS. 1-7, a configurable substation 200 includes first and second power converters arranged in two functional legs 601, 621. In each leg, a three-phase transformer 604, 624 steps down medium-voltage AC power received from a grid and may perform a phase shift. At least one six-pulse rectifier unit 608, 628 on each leg receives the stepped down voltage from a corresponding transformer and generates a rectified voltage, which may be approximately 1500 VDC. Adjustable connectors, such as switch S1 and busbars 650, 652, are arranged to configure the legs either in parallel for a current-source mode or in series for a voltage-source mode. A DC filter 630, possibly composed of two capacitors and two inductors, smooths ripples on the rectified voltage. Additional adjustable connectors may transform the DC filter between current-source and voltage-source configurations to utilize the same components and to protect the capacitors and inductors from excessive voltage or current conditions. Further adjustable connectors, such as switches S4, S5, S8, and S9 may direct the output to the appropriate conductors based on the operating mode.

In the examples of the present disclosure, the configurability of substation 200 provides versatility in the use of a power source of electric vehicles, such as work machine 100. A single structure preferably sized to fit within a standard high-cube ISO shipping container, substation 200 may be readily installed, moved, and decommissioned from a work site as needed while providing a single source for powering motors of a moving work machine via power rails 108 and for charging batteries of a stationary work machine via a charging cable 370. By employing high-power SCRs in a single stage, substation 200 can generate stable levels of voltage and current at megawatts of power in a small frame. Moreover, by reconfiguring DC filter 630 based on the mode of operation, substation 200 can include filter components that are rated below the power capacity of the substation, saving cost and increasing product availability. Accordingly, portable substation 200 can achieve high versatility and power density at a low cost per kilowatt.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Terms of approximation are meant to include ranges of values that do not change the function or result of the disclosed structure or process. For instance, the term "about" generally refers to a range of numeric values that one of skill in the art would consider equivalent to the recited numeric value or having the same function or result. Similarly, the antecedent "substantially" means largely, but not wholly, the same form, manner or degree, and the particular element will have a range of configurations as a person of ordinary skill in the art would consider as having the same function or result.

While aspects of the present disclosure have been particularly shown and described with reference to the embodiments above, it will be understood by those skilled in the art that various additional embodiments may be contemplated by the modification of the disclosed systems and methods without departing from the spirit and scope of what is disclosed. Such embodiments should be understood to fall within the scope of the present disclosure as determined based upon the claims and any equivalents thereof.

What is claimed is:

1. A configurable unit for transferring electrical energy as DC voltage, comprising:

- an input structured to receive three-phase medium-voltage AC power exceeding 10 kV from an external source;
- a first power converter comprising:
  - a first three-phase transformer electrically coupled to the input, the first three-phase transformer configured to provide a step-down of the medium-voltage AC power,
  - a first multi-pulse rectification in a single stage, the first multi-pulse rectification comprising a six-pulse silicon-controlled rectifier unit;
- a second power converter comprising:
  - a second three-phase transformer electrically coupled to the input, the second three-phase transformer configured to provide a phase shift and the step-down of the medium-voltage AC power,
  - second multi-pulse rectification in a single stage, the second multi-pulse rectification comprising a six-pulse silicon-controlled rectifier unit;
- a DC filter having inputs coupled to the first multi-pulse rectification and to the second multi-pulse rectification, the DC filter having filtered outputs providing a filtered voltage exceeding 1 kV; and
- adjustable connectors electrically coupled to the DC filter, the adjustable connectors being changeable between a current-source configuration for charging a battery through the filtered outputs and a voltage-source configuration for powering an electrical motor through the filtered outputs.

2. The configurable unit of claim 1, wherein the current-source configuration includes a detachable parallel connection between the first multi-pulse rectification and the second multi-pulse rectification, and the voltage-source configuration includes a detachable series connection between the first multi-pulse rectification and the second multi-pulse rectification.

3. The configurable unit of claim 2, wherein the detachable parallel connection and the detachable series connection are open, and the filtered outputs include first filtered outputs from the first multi-pulse rectification and second filtered outputs from the second multi-pulse rectification.

4. The configurable unit of claim 1, further comprising charging outputs and powering outputs, wherein the adjustable connectors comprise switches configured to electrically couple the charging outputs with the filtered outputs in the current-source configuration and to electrically couple the powering outputs with the filtered outputs in the voltage-source configuration.

5. The configurable unit of claim 1, wherein the step-down by the first three-phase transformer and the second three-phase transformer is to at least 1 kVAC, and a continuous power output of the configurable unit is at least 1 MW.

6. The configurable unit of claim 5, wherein the configurable unit fits within a standard intermodal high-cube shipping container according to ISO 668:2020 Series 1AAA.

7. The configurable unit of claim 1, wherein the first three-phase transformer is a two-winding transformer having a primary-side winding in a delta configuration and a single secondary-side winding in a delta configuration, the second three-phase transformer is a two-winding transformer having a primary-side winding in a delta configuration and a single secondary-side winding in a wye configuration, the first multi-pulse rectification is a single six-pulse silicon-controlled rectifier unit, and the second multi-pulse rectification is a single six-pulse silicon-controlled rectifier unit.

8. The configurable unit of claim 1, wherein the DC filter comprises a pair of capacitors and a pair of inductors, the adjustable connectors in the current-source configuration connect the pair of inductors in parallel and the pair of capacitors in parallel, and in the voltage-source configuration connect the pair of capacitors in series and connect the pair of inductors respectively with one of the filtered outputs.

9. The configurable unit of claim 1, wherein the first three-phase transformer and the second three-phase transformer are three-winding transformers having a primary-side winding in a delta configuration and secondary-side windings in a delta configuration and a wye configuration, and the first multi-pulse rectification and the second multi-pulse rectification respectively are parallel connections of two six-pulse silicon-controlled rectifier units.

10. The configurable unit of claim 9, further comprising an auxiliary charger coupled to each of the six-pulse silicon-controlled rectifier units.

11. A system, comprising:

a mobile machine, comprising:

a battery bus electrically coupled to a battery;

a traction bus electrically coupled to an electric motor; and a configurable power module for transferring DC electrical energy to the mobile machine, the configurable power module comprising:

an input structured to receive medium-voltage AC power from an external source;

a first power converter comprising:

a first three-phase transformer electrically coupled to the input, the first three-phase transformer configured to provide a phase shift and a first step-down voltage from the medium-voltage AC power, and first multi-pulse rectification circuitry in a single stage configured to produce a first ripple voltage from the first step-down voltage, a second power converter comprising:

a second three-phase transformer electrically coupled to the input, the second three-phase transformer configured to provide the phase shift and a second step-down voltage from the medium-voltage AC power, and second multi-pulse rectification circuitry in a single stage configured to produce a second ripple voltage from the second step-down voltage, a DC filter configured to provide a filtered output from the first ripple voltage and the second ripple voltage, and adjustable connectors electrically coupled to the DC filter, the adjustable connectors being changeable between a charging mode and a powering mode, the charging mode configured to provide current of the filtered output to the battery bus via a first charging conductor while the mobile machine is stationary, the powering mode configured to provide voltage of the filtered output to the traction bus via a powering conductor while the mobile machine is moving.

12. The system of claim 11, wherein in the charging mode, the first power converter provides current to the battery bus via the first charging conductor and the second power converter provides current to the battery bus via a second charging conductor.

13. The system of claim 11, wherein in the charging mode, the adjustable connectors establish a detachable parallel connection between the first multi-pulse rectification circuitry and the second multi-pulse rectification circuitry.

14. The system of claim 11, wherein in the powering mode, the adjustable connectors establish a detachable series combination between the first multi-pulse rectification circuitry and the second multi-pulse rectification circuitry.

15. The system of claim 14, wherein the powering conductor is a rail, and in the powering mode, the first power converter in series with the second power converter provides voltage to the traction bus via the rail and a pantograph.

16. A method, comprising:

receiving medium-voltage AC power at a substation from an external source;

stepping down, in a first power converter of the substation, the medium-voltage AC power to a first stepped-down AC voltage;

providing multi-pulse rectification to the first stepped-down AC voltage to generate a first rectified DC voltage;

stepping down and phase shifting, in a second power converter of the substation, the medium-voltage AC power to a second stepped-down AC voltage;

providing multi-pulse rectification to the second stepped-down AC voltage to generate a second rectified DC voltage;

filtering in a DC filter the first rectified DC voltage and the second rectified DC voltage;

in a charging mode, feeding DC current from one of the first power converter and the second power converter of the substation through a first charging conductor to a battery of a stationary mobile machine;

converting from the charging mode to a powering mode, comprising establishing a series connection between the first power converter and the second power converter; and in the powering mode, supplying the first rectified DC voltage and the second rectified DC voltage as a series combination from the substation through a powering conductor to an electric motor of a moving mobile machine.

17. The method of claim 16, further comprising, in the charging mode, connecting in parallel the first power converter and the second power converter.

18. The method of claim 16, further comprising, in the charging mode, feeding current from another of the first power converter and the second power converter through a second charging conductor to the battery of the stationary mobile machine.

19. The method of claim 16, further comprising, changing from the powering mode to the charging mode, the changing comprising disconnecting the series connection and establishing a parallel connection between the first power converter and the second power converter.

20. The method of claim 19, wherein changing from the powering mode to the charging mode further comprises changing a connection of two capacitors in the DC filter from being in series to being in parallel and changing a connection of two inductors in the DC filter to be in parallel.

* * * * *